(12) United States Patent
Gu et al.

(10) Patent No.: US 12,326,997 B2
(45) Date of Patent: Jun. 10, 2025

(54) INTEGRATED DISPLAY AND SENSING APPARATUS

(71) Applicant: Viewtrix Technology Co., Ltd., Shenzhen (CN)

(72) Inventors: Jing Gu, Shanghai (CN); Xiujian Zhu, Kunshan (CN)

(73) Assignees: VIEWTRIX TECHNOLOGY CO., LTD., Shenzhen (CN); KUNSHAN GOVISIONOX OPTOELECTRONICS.CO., LTD., Kunshan (CN)

( * ) Notice: Subject to any disclaimer, the term of this patent is extended or adjusted under 35 U.S.C. 154(b) by 0 days.

(21) Appl. No.: 16/736,382

(22) Filed: Jan. 7, 2020

(65) Prior Publication Data
US 2020/0142534 A1    May 7, 2020

Related U.S. Application Data

(63) Continuation of application No. PCT/CN2017/099096, filed on Aug. 25, 2017.

(51) Int. Cl.
  *G06F 3/042* (2006.01)
  *G06F 3/041* (2006.01)
  *G09G 3/3233* (2016.01)

(52) U.S. Cl.
  CPC .......... *G06F 3/0421* (2013.01); *G06F 3/0412* (2013.01); *G09G 3/3233* (2013.01);
  (Continued)

(58) Field of Classification Search
  CPC ..... G06K 9/0004; G06F 3/0412; G06F 3/042; G06F 3/0421
  See application file for complete search history.

(56) References Cited

U.S. PATENT DOCUMENTS

| 8,330,685 B2 * | 12/2012 | Park | G09G 3/3233 |
| | | | 345/82 |
| 2006/0139257 A1 * | 6/2006 | Kwak | G09G 3/3233 |
| | | | 345/76 |

(Continued)

FOREIGN PATENT DOCUMENTS

| CN | 1801298 A | 7/2006 |
| CN | 102265244 A | 11/2011 |

(Continued)

OTHER PUBLICATIONS

International Search Report issued in corresponding International Application No. PCT/CN2017/099096, mailed May 30, 2019, 5 pages.

(Continued)

*Primary Examiner* — Yuzhen Shen
(74) *Attorney, Agent, or Firm* — Bayes PLLC

(57) ABSTRACT

An apparatus includes a backplane, a light emitting layer, a sensing layer, and a cover layer. The backplane includes an array of display pixel circuits and an array of sensing pixel circuits formed on a same substrate. The light emitting layer includes an array of light emitting elements above the backplane. Each display pixel circuit is configured to drive a plurality of light emitting elements. The sensing layer includes an array of optical sensing elements above the light emitting layer. Each sensing pixel circuit is configured to drive a respective optical sensing element. The cover layer is above the sensing layer. When an object is in contact with the cover layer, at least one optical sensing element is configured to detect optical information of the object based, at least in part, on light generated by at least one light emitting element and reflected by the object.

31 Claims, 13 Drawing Sheets

(52) U.S. Cl.
CPC ............... *G09G 2300/0465* (2013.01); *G09G 2360/148* (2013.01)

(56) References Cited

U.S. PATENT DOCUMENTS

| | | | | |
|---|---|---|---|---|
| 2009/0295280 | A1* | 12/2009 | Yang | H01L 51/5284 |
| | | | | 257/E51.024 |
| 2010/0007632 | A1* | 1/2010 | Yamazaki | G06F 21/32 |
| | | | | 345/175 |
| 2011/0102365 | A1* | 5/2011 | Park | G06F 3/042 |
| | | | | 345/174 |
| 2014/0131556 | A1* | 5/2014 | Abukawa | H01L 27/14603 |
| | | | | 250/208.2 |
| 2015/0243712 | A1* | 8/2015 | Wang | H01L 31/09 |
| | | | | 257/40 |
| 2016/0275910 | A1* | 9/2016 | Lee | G09G 3/3225 |
| 2017/0018223 | A1* | 1/2017 | Li | G09G 3/3258 |
| 2017/0199610 | A1* | 7/2017 | Kitchens, II | G06F 3/043 |
| 2018/0052359 | A1* | 2/2018 | Umemoto | G06F 3/0412 |
| 2018/0053032 | A1* | 2/2018 | Ding | G06K 9/0004 |
| 2018/0210571 | A1* | 7/2018 | Wang | G06F 3/042 |
| 2019/0025971 | A1* | 1/2019 | Li | G06F 3/047 |
| 2019/0049760 | A1* | 2/2019 | Hyun | H05B 47/10 |
| 2019/0065805 | A1* | 2/2019 | Zhao | G01S 7/52079 |
| 2019/0279565 | A1* | 9/2019 | Yang | G09G 3/3275 |
| 2020/0243620 | A1* | 7/2020 | Abe | H10K 50/856 |

FOREIGN PATENT DOCUMENTS

| | | |
|---|---|---|
| CN | 103914177 A | 7/2014 |
| CN | 106229331 A | 12/2016 |
| CN | 106298856 A | 1/2017 |
| CN | 106654067 A | 5/2017 |
| CN | 106898636 A | 6/2017 |
| CN | 107066162 A | 8/2017 |
| WO | 2016141777 A2 | 9/2016 |

OTHER PUBLICATIONS

Written Opinion of the International Searching Authority issued in corresponding International Application No. PCT/CN2017/099096, mailed May 30, 2019, 4 pages.

Office Action in related Chinese Application No. 201780094246.1 dated Mar. 30, 2023 (19 pages).

* cited by examiner

INTEGRATED DISPLAY AND SENSING APPARATUS

CROSS REFERENCE TO RELATED APPLICATION

This application is continuation of International Application No. PCT/CN2017/099096, filed on Aug. 25, 2017, entitled "INTEGRATED DISPLAY AND SENSING APPARATUS," which is hereby incorporated by reference in its entirety.

BACKGROUND

The disclosure relates generally to display technologies, and more particularly, to display and sensing apparatus.

Under-display sensors (also called in-display sensors), such as under-display fingerprint sensors, have become promising technologies in mobile devices as they offer compact size and low power consumption to the mobile devices by integrating the sensors into the display screen. For example, by integrating the fingerprint sensor into the display panel, narrow-bezel or bezel-less designs of the display screen can be achieved on mobile devices, allowing for more screen area.

Known under-display fingerprint sensors employ optical sensing techniques, capacitive sensing techniques, or ultrasonic sensing techniques, each of which has challenges in performance and/or cost. For example, for known under-display optical fingerprint sensors, due to the limited space on the backplane on which display pixel circuits are formed, the sensing pixel circuits (e.g., including thin film transistors (TFTs) and wirings) for the photodiodes are disposed above the light source (e.g., organic light emitting diodes (OLEDs)), which decreases the intensity of the light emitting from the light source to the finger and increases the manufacturing cost and complexity of the sensing layer in which the photodiodes and sensing pixel circuits are formed.

SUMMARY

The disclosure relates generally to display technologies, and more particularly, to display and sensing apparatus.

In one example, an apparatus includes a backplane, a light emitting layer, a sensing layer, and a cover layer. The backplane includes an array of display pixel circuits and an array of sensing pixel circuits. The array of display pixel circuits and the array of sensing pixel circuits are formed on a same substrate. The light emitting layer includes an array of light emitting elements above the backplane. Each display pixel circuit of the array of display pixel circuits is configured to drive a plurality of light emitting elements in the array of light emitting elements. The sensing layer includes an array of optical sensing elements above the light emitting layer. Each sensing pixel circuit of the array of sensing pixel circuits is configured to drive a respective optical sensing element in the array of optical sensing elements. The cover layer is above the sensing layer. When an object is in contact with the cover layer, at least one optical sensing element of the array of optical sensing elements is configured to detect optical information of the object based, at least in part, on light generated by at least one light emitting element of the array of light emitting elements and reflected by the object.

In another example, an apparatus includes a display and control logic. The display includes a backplane, a light emitting layer, a sensing layer, and a cover layer. The backplane includes an array of display pixel circuits and an array of sensing pixel circuits. The array of display pixel circuits and the array of sensing pixel circuits are formed on a same substrate. The light emitting layer includes an array of OLEDs above the backplane. Each display pixel circuit of the array of display pixel circuits is configured to drive a plurality of OLEDs in the array of OLEDs. The sensing layer includes an array of photodiodes above the light emitting layer. Each sensing pixel circuit of the array of sensing pixel circuits is configured to drive a respective photodiode in the array of photodiodes. The cover layer is above the sensing layer. The control logic is operatively coupled to the display and configured to receive display data and provide control signals based, at least in part, on the display data to control operation of the array of display pixel circuits and operation of the array of sensing pixel circuits. When no object is in contact with the cover layer, the array of OLEDs are configured to emit light to display an image based on the display data received by the control logic. When an object is in contact with the cover layer, at least one photodiode of the array of photodiodes is configured to detect optical information of the object based, at least in part, on light generated by at least one OLED of the array of OLEDs and reflected by the object.

In still another example, an apparatus includes a backplane, a light emitting layer, a sensing layer, and a cover layer. The backplane includes an array of display pixel circuits and an array of sensing pixel circuits. The array of display pixel circuits and the array of sensing pixel circuits are formed on a same substrate. The light emitting layer includes an array of light emitting elements above the backplane. Each display pixel circuit of the array of display pixel circuits is operatively coupled to a plurality of light emitting elements in the array of light emitting elements and is configured to drive the plurality of light emitting elements. The sensing layer includes an array of sensing elements above the light emitting layer. Each sensing pixel circuit of the array of sensing pixel circuits is operatively coupled to a respective sensing element in the array of sensing elements and is configured to drive the respective sensing element. The cover layer is above the sensing layer. When a finger is in contact with the cover layer, at least one sensing element of the array of sensing elements is configured to detect fingerprint information of the finger. When no finger is in contact with the cover layer, the array of light emitting elements are configured to emit light to display an image.

In yet another example, an apparatus includes a backplane, a sensing layer, a light emitting layer, and a cover layer. The backplane includes an array of display pixel circuits and an array of sensing pixel circuits. The array of display pixel circuits and the array of sensing pixel circuits are formed on a same substrate. The sensing layer includes an array of sensing elements above the backplane. Each sensing pixel circuit of the array of sensing pixel circuits is operatively coupled to a respective sensing element in the array of sensing elements and is configured to drive the respective sensing element. The light emitting layer includes an array of light emitting elements above the sensing layer. Each display pixel circuit of the array of display pixel circuits is operatively coupled to a plurality of light emitting elements in the array of light emitting elements and is configured to drive the plurality of light emitting elements. The cover layer is above the light emitting layer. When a finger is in contact with the cover layer, at least one sensing element of the array of sensing elements is configured to detect fingerprint information of the finger. When no finger is in contact with the cover layer, the array of light emitting elements are configured to emit light to display an image.

In yet another example, an apparatus includes a backplane, a sensing layer, a light emitting layer, and a cover layer. The backplane includes an array of display pixel circuits and an array of sensing pixel circuits. The array of display pixel circuits and the array of sensing pixel circuits are formed on a same first substrate. The sensing layer includes an array of sensing elements above the backplane. Each sensing pixel circuit of the array of sensing pixel circuits is operatively coupled to a respective sensing element in the array of sensing elements and is configured to drive the respective sensing element. The light emitting layer includes an array of light emitting elements above the sensing layer. The light emitting layer is formed on a same second substrate as the sensing layer. Each display pixel circuit of the array of display pixel circuits is operatively coupled to a plurality of light emitting elements in the array of light emitting elements and is configured to drive the plurality of light emitting elements. The cover layer is above the sensing layer and the light emitting layer. When a finger is in contact with the cover layer, at least one sensing element of the array of sensing elements is configured to detect fingerprint information of the finger. When no finger is in contact with the cover layer, the array of light emitting elements are configured to emit light to display an image.

In a different example, a method is provided for manufacturing an integrated display and sensing apparatus. A backplane including an array of display pixel circuits and an array of sensing pixel circuits is formed. The array of display pixel circuits and the array of sensing pixel circuits are formed on a same substrate. A light emitting layer including an array of light emitting elements is formed above the backplane. Each display pixel circuit of the array of display pixel circuits is operatively coupled to a plurality of light emitting elements in the array of light emitting elements. A sensing layer including an array of sensing elements is formed above the light emitting layer. Each sensing pixel circuit of the array of sensing pixel circuits is operatively coupled to a respective sensing element in the array of sensing elements. A cover layer is formed above the sensing layer.

In another example, a method is provided for manufacturing an integrated display and sensing apparatus. A backplane including an array of display pixel circuits and an array of sensing pixel circuits is formed. The array of display pixel circuits and the array of sensing pixel circuits are formed on a same substrate. A sensing layer including an array of sensing elements is formed above the backplane. Each sensing pixel circuit of the array of sensing pixel circuits is operatively coupled to a respective sensing element in the array of sensing elements. A light emitting layer including an array of light emitting elements is formed above the sensing layer. Each display pixel circuit of the array of display pixel circuits is operatively coupled to a plurality of light emitting elements in the array of light emitting elements. A cover layer is formed above the light emitting layer.

In still another example, a method is provided for manufacturing an integrated display and sensing apparatus. A backplane including an array of display pixel circuits and an array of sensing pixel circuits is formed. The array of display pixel circuits and the array of sensing pixel circuits are formed on a same first substrate. A sensing layer and a light emitting layer are formed on a same second substrate above the sensing layer. The sensing layer includes an array of sensing elements. Each sensing pixel circuit of the array of sensing pixel circuits is operatively coupled to a respective sensing element in the array of sensing elements. The light emitting layer includes an array of light emitting elements. Each display pixel circuit of the array of display pixel circuits is operatively coupled to a plurality of light emitting elements in the array of light emitting elements. A cover layer is formed above the sensing layer and the light emitting layer.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
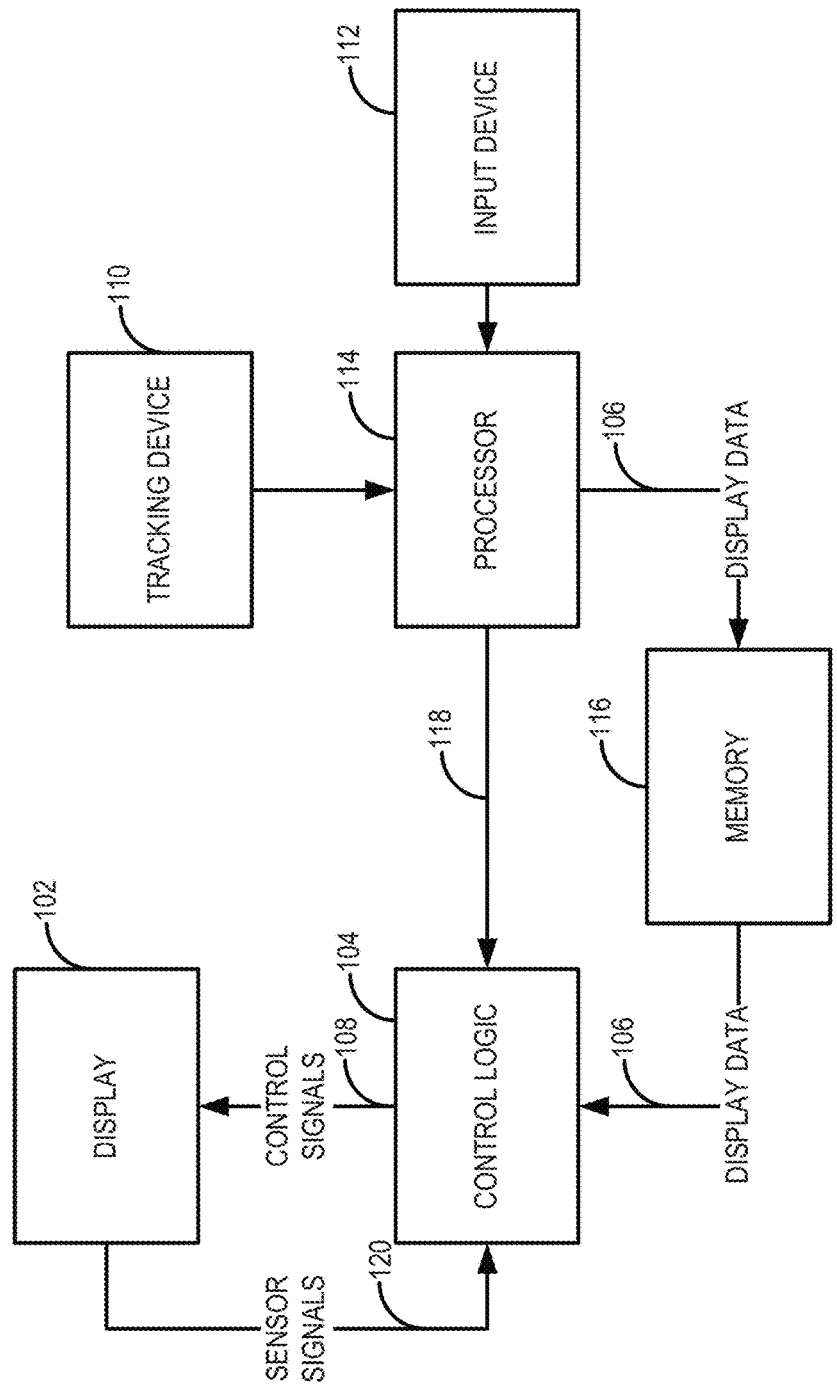
FIG. 1 is a block diagram illustrating an apparatus including a display and control logic in accordance with an embodiment.

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Spatially relative terms, such as "beneath," "below," "lower," "above," "upper," and the like may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the term "substrate" describes a material onto which subsequent material layers are added. The substrate itself may be patterned. Materials added on top of the substrate may be patterned or may remain unpatterned. Furthermore, the substrate may be a wide array of semiconductor materials such as, for example, silicon, germanium, gallium arsenide, indium phosphide, etc. Alternatively, the substrate may be made from an electrically non-conductive material such as, for example, a glass, a plastic, or a sapphire wafer.

As used herein, the term "p-type" defines a structure, layer, and/or region as being doped with p-type dopants, such as, for example, boron. As used herein, the term "n-type" defines a structure, layer, and/or region as being doped with n-type dopants, such as, for example, phosphorus.

As will be disclosed in detail below, among other novel features, the integrated display and sensing apparatus disclosed herein includes sensing pixel circuits that are formed on the same backplane on which the display pixel circuits are formed, thereby saving space for under-display sensing elements. In some embodiments, a display pixel circuit-sharing scheme may be applied so that multiple light emitting elements can share the same display pixel circuit, thereby reducing the total area of display pixel circuits occupied on the substrate of the backplane. The saved area on the backplane may be used for forming sensing pixel circuits, which traditionally cannot be formed on the same substrate as the display pixel circuits due to the limited area on the backplane. By forming the sensing pixel circuits on the backplane, performance improvement can be achieved for the under-display fingerprint recognition, for example, by increasing the aperture ratio of each sensing pixel cell in the sensing layer.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 illustrates an apparatus 100 including a display 102 and control logic 104. Apparatus 100 may be any suitable device, for example, a virtual reality (VR) or augmented reality (AR) device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device.

In this embodiment, display 102 is operatively coupled to control logic 104 and is part of apparatus 100, such as but not limited to, a head-mounted display, handheld device screen, computer monitor, television screen, head-up display (HUD), dashboard, electronic billboard, or electronic sign. Display 102 may be an OLED display, liquid crystal display (LCD), E-ink display, electroluminescent display (ELD), billboard display with LED or incandescent lamps, or any other suitable type of display. Display 102 may be an integrated display and sensing apparatus because display 102 can perform under-display sensing, for example, fingerprint recognition using various types of sensing elements as described below in detail.

Control logic 104 may be any suitable hardware, software, firmware, or combination thereof, configured to receive display data 106 (e.g., display pixel data) and generate control signals 108 for driving the display subpixels (e.g., light emitting elements) on display 102. Control signals 108 are used for controlling writing of display data 106 (either in its original form or in a converted form) to the display subpixels and directing operations of display 102. For example, subpixel rendering (SPR) algorithms for various subpixel arrangements may be part of control logic 104 or implemented by control logic 104. As described below in detail with respect to FIG. 8, control logic 104 in one embodiment may include a display control signal generating module 802 having a timing controller (TCON) 808 and a clock generator 810, a data interface 804, and a data converting module 806 having a storing unit 812 and a data reconstructing unit 814. Control logic 104 may include any other suitable components, such as an encoder, a decoder, one or more processors, controllers, and storage devices. Control logic 104 may be implemented as a standalone integrated circuit (IC) chip, such as an application-specific integrated circuit (ASIC) or a field-programmable gate array (FPGA). Apparatus 100 may also include any other suitable components such as, but not limited to tracking devices 110 (e.g., inertial sensors, camera, eye tracker, GPS, or any other suitable devices for tracking motion of eyeballs, facial expression, head movement, body movement, and hand and body gesture), input devices 112 (e.g., a mouse, keyboard, remote controller, handwriting device, microphone, scanner, etc.), and speakers (not shown).

In some embodiments, control logic 104 may be manufactured in a chip-on-glass (COG) package, for example, when display 102 is a rigid display. In some embodiments, control logic 104 may be manufactured in a chip-on-film (COF) package, for example, when display 102 is a flexible display, e.g., a flexible OLED display. In some embodiments, control logic 104 may be manufactured in a single-layer COF package. It is to be appreciated that control logic 104 may be integrated with display driving circuits, such as gate driving circuits, source driving circuits, and light emitting driving circuits, in a display driver IC. The driver IC, including control logic 104 and the display driving circuits, may be manufactured in a COF package, such as a single-layer COF package.

In some embodiments, apparatus 100 may be a handheld or a VR/AR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or from processor 114 directly.

In this embodiment, as an integrated display and sensing apparatus, display 102 also includes an array of sensing elements (sensing pixels) for performing under-display sensing, such as photodiodes, capacitors, piezoelectric elements, etc. Sensing results from the sensing elements may be provided as sensors signals 120 from display 102 to control logic 104. Control logic 104 may process sensor signals 120 before transmitting sensor signals 120 to processor 114 and/or memory 116. In some embodiments, sensor signals 120 may be provided by display 102 to processor 114 and/or memory 116 directly without passing through control logic 104.

As described below in detail with respect to FIG. 8, control logic 104 in one embodiment may further include a sensor control signal generating module 818 including a TCON 820 and a clock generator 822. It is to be appreciated that, in some embodiments, control logic 104 may be further integrated with sensing control circuits, such as row selector circuits and column readout circuits, in the display driver IC. In some embodiments, the sensing control circuits may be integrated in a sensing control IC that is separate from the display driver IC.

Figure 2A:
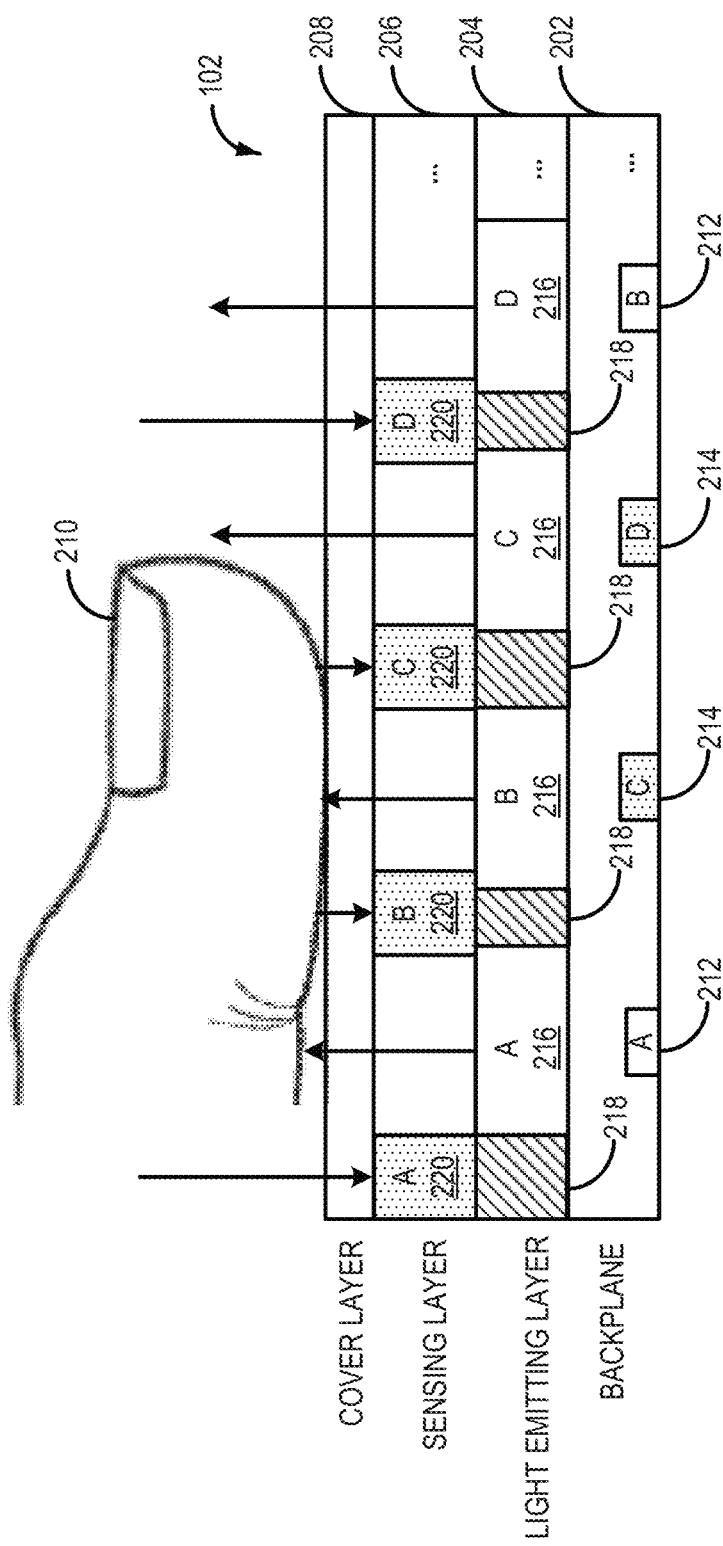
FIG. 2A is a side-view diagram illustrating an example of the display shown in FIG. 1 in accordance with an embodiment.

FIG. 2A is a side-view diagram illustrating an example of display 102 shown in FIG. 1 in accordance with an embodiment. In this embodiment, display 102 includes a backplane 202, a light emitting layer 204 formed above backplane 202, a sensing layer 206 formed above light emitting layer 204, and a cover layer 208 formed above sensing layer 206. It is to be appreciated that, in some embodiments, additional structures, e.g., interlayer insulation films, may be formed between backplane 202, light emitting layer 204, sensing layer 206, and cover layer 208. In addition to displaying images, display 102 in this embodiment can detect an object, e.g. fingerprint information of a finger 210, when the object is in contact with (or in close proximity to) cover layer 208 of display 102.

Backplane 202 in this embodiment includes an array of display pixel circuits 212 and an array of sensing pixel circuits 214. Display pixel circuits 212 and sensing pixel circuits 214 are formed on the same substrate of backplane 202. In some embodiments, the substrate of backplane 202 may be a transparent substrate, such as a glass substrate, a sapphire substrate, or a plastic substrate, deposited with semiconductor materials, such as low temperature polysilicon (LTPS) or amorphous silicon (a-Si). Other semiconductor materials having a higher mobility compared with LTPS or a-Si may be deposited on the transparent substrate as well, such as indium gallium zinc oxide (IGZO). In some embodiments, the substrate of backplane 202 may be a single-crystal silicon substrate (e.g., a bulk silicon substrate or a silicon-on-insulator (SOI) substrate) or a compound semiconductor substrate (e.g., a GaAs substrate). It is to be appreciated that backplane 202 (and display pixel circuits 212 and sensing pixel circuits 214 therein) may include multiple sub-layers as known in the art.

Each display pixel circuit 212 includes a plurality of TFTs, at least one capacitor, and wirings. Depending on the substrate material and/or the semiconductor material deposited on the substrate, the TFTs of display pixel circuits 212 may be p-type TFTs (e.g., PMOS LTPS-TFTs), n-type TFTs (e.g., NMOS a-Si TFTs), organic TFTs (OTFTs), or IGZO TFTs. Similarly, each sensing pixel circuit 214 includes a plurality of TFTs and wirings as well. Additional components of sensing pixel circuit 214, such as capacitors, may be formed depending on the specific type of sensing elements driven by sensing pixel circuit 214. In some embodiments, the same photolithography process may be used to pattern array of display pixel circuits 212 and array of sensing pixel circuits 214 on the same substrate of backplane 202. It is to be appreciated that the layout of array of display pixel circuits 212 and array of sensing pixel circuits 214 (in a plan view) can be any suitable layouts as long as array of display pixel circuits 212 and array of sensing pixel circuits 214 are arranged on the same substrate of backplane 202.

Light emitting layer 204 in this embodiment includes an array of light emitting elements 216, each corresponding to a display subpixel. A, B, C, and D in FIG. 2A denote light emitting elements 216 in different colors, such as but not limited to, red, green, blue, yellow, cyan, magenta, or white. Light emitting layer 204 also includes a black matrix 218 disposed between light emitting elements 216. Black matrix 218, as the borders of light emitting elements 216, is used for blocking lights coming out from the parts outside light emitting elements 216. Each light emitting element 216 in light emitting layer 204 can emit light in a predetermined color and brightness. In some embodiments, each light emitting element 216 may be an OLED formed in a sandwich structure having an anode, an organic light-emitting layer, and a cathode, as known in the art. Depending on the characteristics (e.g., material, structure, etc.) of the organic light-emitting layer of the respective OLED, the OLED may present a distinct color and brightness. Various patterning architectures may be used to arrange light emitting elements 216 in light emitting layer 204, such as the side-by-side patterning architecture, the white OLEDs with color filters (WOLED+CF) patterning architecture, or the blue OLEDs with transfer color filters (BOLED+transfer CF) patterning architecture.

In this embodiment, each display pixel circuit 212 on backplane 202 is operatively coupled to a plurality of light emitting elements 216 in light emitting layer 204, for example, by making electrical connections through interconnects (e.g., vias, wirings, etc.) between backplane 202 and light emitting layer 204. Each display pixel circuit 212 in backplane 202 is configured to drive the plurality of light emitting elements 216 in light emitting layer 204. For example, as shown in FIG. 2A, display pixel circuit A may be operatively coupled to two light emitting elements A and B and configured to drive the two light emitting elements A and B. Similarly, display pixel circuit B may be operatively coupled to two light emitting elements C and D and configured to drive the two light emitting elements C and D. In the conventional displays, since each display pixel circuit is configured to drive only one light emitting element, the number of the display pixel circuits is the same as the number of the light emitting elements. In contrast, in the present disclosure, by having each display pixel circuit 212 to drive multiple light emitting elements (i.e., employing a display pixel circuit-sharing scheme), the total area of display pixel circuits 212 on backplane 202 can be reduced, and the saved area can be used to arrange sensing pixel circuits 214.

Sensing layer 206 in this embodiment includes an array of optical sensing elements 220. Each optical sensing element 220 may be a photodiode. As described above, sensing pixel circuits 214 used for driving optical sensing elements 220 are not formed in sensing layer 206, but instead, are formed on backplane 202 as display pixel circuits 212. Thus, each sensing pixel circuit 214 on backplane 202 is operatively coupled to respective optical sensing element 220 in sensing layer 206 for example, by making electrical connections through interconnects (e.g., vias, wirings, etc.) between backplane 202 and sensing layer 206. Each sensing pixel circuit 214 on backplane 202 is configured to drive respective optical sensing element 220 in sensing layer 206. In some embodiments, optical sensing elements 220 may be formed on a transparent substrate of sensing layer 206, such as a glass, sapphire, or plastic substrate. As shown in FIG. 2A, the regions between optical sensing elements 220 are transparent to light emitted from light emitting elements 216 in light emitting layer 204. It is to be appreciated that in some embodiments, sensing layer 206 may be formed underneath light emitting layer 204.

Cover layer 208 in this embodiment may include an encapsulation layer and/or a cover plate (protective plate) to enclose and protect the structures described above. The encapsulation layer and cover plate may be made of a transparent material, such as glass, sapphire, or plastic. In operation, when finger 210 (or any other objects) is in contact with cover layer 208, the incident light beams generated from at least some light emitting elements 216 (e.g., A and B 216 shown in FIG. 2A) in light emitting layer 204 penetrate through sensing layer 206 and cover layer 208 to reach finger 210 to irradiate the interface between cover layer 208 and finger 210. In some embodiments, light emitting elements 216 are configured to emit light in the same color as the incident light beams. At the interface, reflection occurs for at least part of the incident light beams, generating the reflected light beams that are transmitted back to at least some optical sensing elements 220 (e.g., B and C 220 shown in FIG. 2A). Thus, optical information of the object, e.g., fingerprint information of finger 210, may be detected by optical sensing elements 220. For example, image collected by optical sensing elements 220 may have a size almost the same as that of the fingerprint on cover layer 208, and the light intensity and spatial distribution of the reflected light beams may vary according to the shapes (e.g., ridges and valleys) of the fingerprint. As a result, valid fingerprint image signals (e.g., fingerprint gray scale image signals) can be obtained.

In some embodiments, sensing layer 206 may further include one or more object sensors (not shown) configured to detect a region in which the object is in contact with cover layer 208. As a result, only optical sensing elements 220 and light emitting elements 216 that are in the detected region are used to detect optical information of the object. In some embodiments, a region may be predefined for object detection, e.g., fingerprint recognition, and optical sensing elements 220 and light emitting elements 216 that are in the predefined region are used to detect optical information of the object.

It is to be appreciated that in some embodiments, other types of sensing elements may be formed in sensing layer 206 in additional to or instead of optical sensing elements 220. For example, capacitive sensing elements, thermal sensing elements, ultrasonic sensing elements, or pressure sensing elements may be formed in sensing layer 206. Regardless of the types of sensing elements, corresponding sensing pixel circuits 214 are formed on backplane 202 on which display pixel circuits 212 are formed.

Figure 2B:
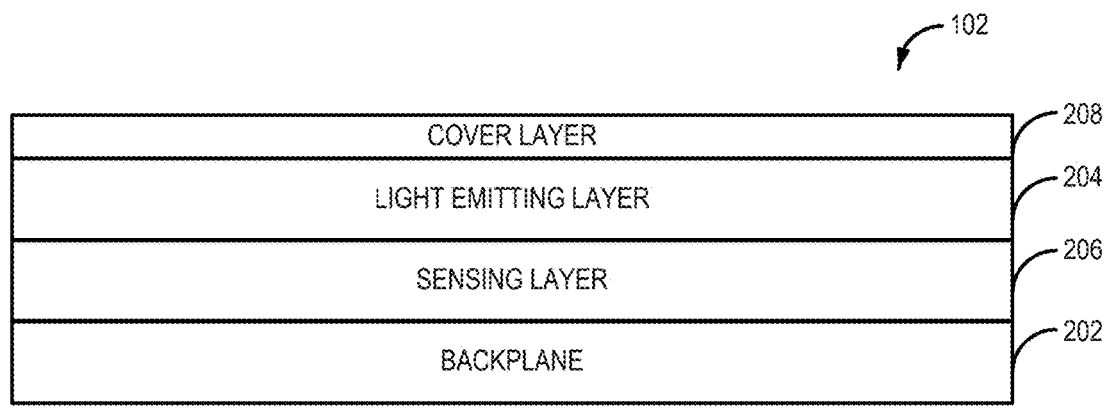
FIG. 2B is a side-view diagram illustrating another example of the display shown in FIG. 1 in accordance with an embodiment.

FIG. 2B is a side-view diagram illustrating another example of display 102 shown in FIG. 1 in accordance with an embodiment. Different from the example shown in FIG. 2A, in this embodiment, light emitting layer 204 is formed above sensing layer 206. Sensing layer 206 is formed above backplane 202 on which array of display pixel circuits 212 and array of sensing pixel circuits 214 are formed. Display pixel circuits 212 on backplane 202 are operatively coupled to corresponding light emitting elements 216 in light emitting layer 204 through interconnects passing through sensing layer 206. Sensing pixel circuits 214 on backplane 202 are operatively coupled to corresponding sensing elements in sensing layer 206 through interconnects. Sensing elements may be optical sensing elements 220 or any other types of sensing elements, such as capacitive sensing elements, thermal sensing elements, ultrasonic sensing elements, or pressure sensing elements. Cover layer 208 is formed above light emitting layer 204. It is to be appreciated that, in some embodiments, additional structures, e.g., interlayer insulation films, may be formed between backplane 202, light emitting layer 204, sensing layer 206, and cover layer 208.

Figure 2C:
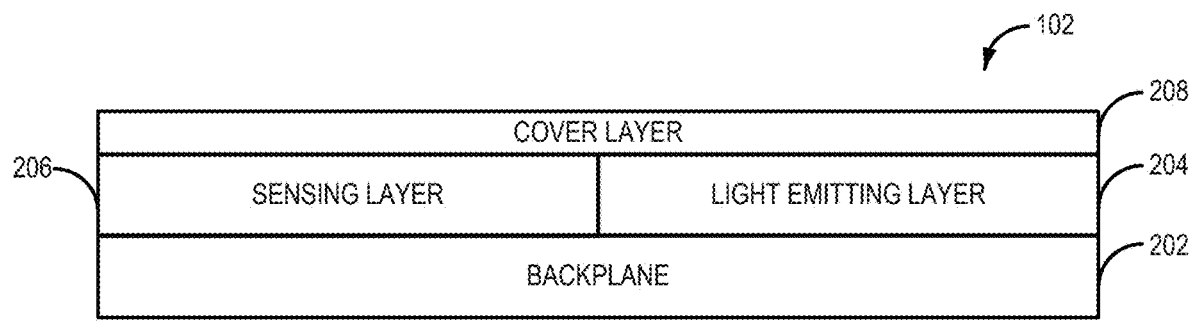
FIG. 2C is a side-view diagram illustrating still another example of the display shown in FIG. 1 in accordance with an embodiment.

FIG. 2C is a side-view diagram illustrating another example of display 102 shown in FIG. 1 in accordance with an embodiment. Different from the example shown in FIG. 2A, in this embodiment, light emitting layer 204 and sensing layer 206 are formed on the same substrate above backplane 202 on which array of display pixel circuits 212 and array of sensing pixel circuits 214 are formed. Light emitting layer 204 and sensing layer 206 thus may be considered as a single combined layer in this embodiment. In some embodiments, different masks may be used to form light emitting elements 216 and sensing elements on the same substrate in the single combined layer of light emitting layer 204 and sensing layer 206. Display pixel circuits 212 on backplane 202 are operatively coupled to corresponding light emitting elements 216 in the combined layer through interconnects passing through the substrate of the combined layer. Sensing pixel circuits 214 on backplane 202 are operatively coupled to corresponding sensing elements in the combined layer through interconnects passing through the substrate of the combined layer. Sensing elements may be optical sensing elements 220 or any other types of sensing elements, such as capacitive sensing elements, thermal sensing elements, ultrasonic sensing elements, or pressure sensing elements. Cover layer 208 is formed above the combined layer of light emitting layer 204 and sensing layer 206. It is to be appreciated that, in some embodiments, additional structures, e.g., interlayer insulation films, may be formed between backplane 202, the combined layer of light emitting layer 204 and sensing layer 206, and cover layer 208.

Figure 2D:
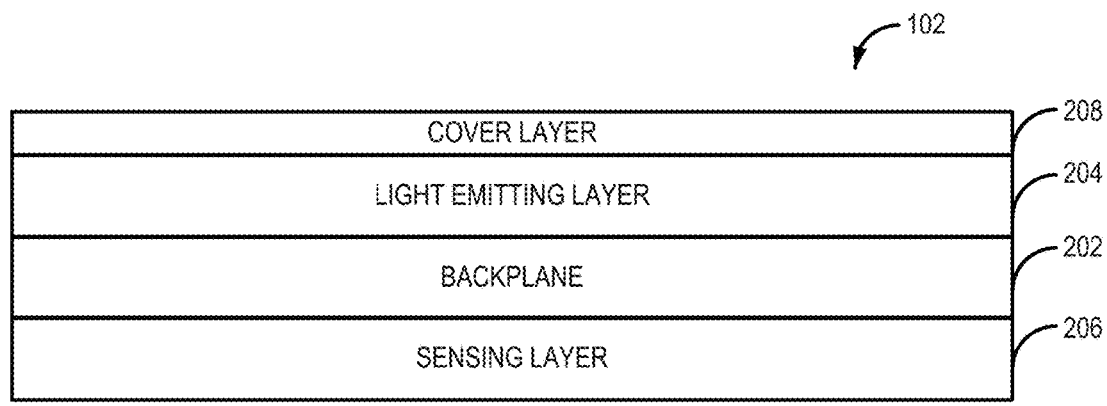
FIG. 2D is a side-view diagram illustrating yet another example of the display shown in FIG. 1 in accordance with an embodiment.

FIG. 2D is a side-view diagram illustrating yet another example of display 102 shown in FIG. 1 in accordance with an embodiment. Different from the example shown in FIG. 2A, in this embodiment, backplane 202 on which array of display pixel circuits 212 and array of sensing pixel circuits 214 are formed is formed above sensing layer 206. Light emitting layer 204 is formed above backplane 202. Display pixel circuits 212 on backplane 202 are operatively coupled to corresponding light emitting elements 216 in light emitting layer 204 through interconnects. Sensing pixel circuits 214 on backplane 202 are operatively coupled to corresponding sensing elements in sensing layer 206 through interconnects. Sensing elements may be optical sensing elements 220 or any other types of sensing elements, such as capacitive sensing elements, thermal sensing elements, ultrasonic sensing elements, or pressure sensing elements. Cover layer 208 is formed above light emitting layer 204. It is to be appreciated that, in some embodiments, additional structures, e.g., interlayer insulation films, may be formed between backplane 202, light emitting layer 204, sensing layer 206, and cover layer 208.

In some embodiments, sensing elements in sensing layer 206 are ultrasonic sensing elements. Each ultrasonic sensing element may include transmitter and receiver top contacts and electrodes, such as silver electrodes, and transmitter and receiver piezoelectric thin films, such as PVDF-TrFE copolymers. Each sensing pixel circuit on backplane 202 above sensing layer 206 may include both a transmitter circuit for driving the ultrasound transmitter in the respective ultrasonic sensing element and a receiver circuit for driving the ultrasound receiver in the respective ultrasonic sensing element.

Figure 3:
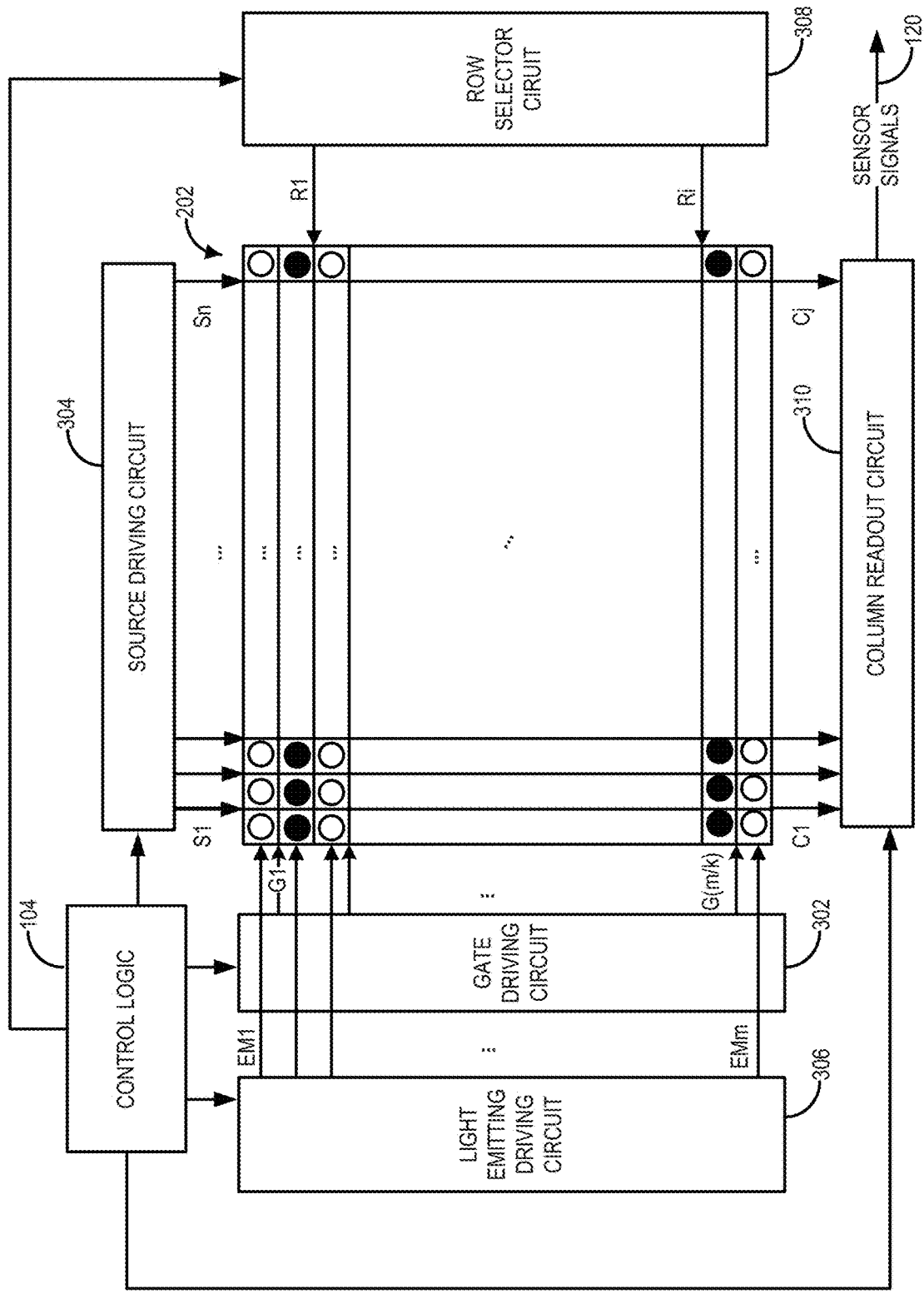
FIG. 3 is a block diagram illustrating an example of a backplane and display driving circuits and sensing control circuits of the display shown in FIG. 1 in accordance with an embodiment.

FIG. 3 is a block diagram illustrating an example of backplane 202 and display driving circuits and sensing control circuits of display 102 shown in FIG. 1 in accordance with an embodiment. Display 102 in this embodiment includes backplane 202 having array of display pixel circuits 212 (represented as white dots) and array of sensing pixel circuits 214 (represented as black dots). Display 102 may also include on-panel display driving circuits, e.g., a gate driving circuit 302, a source driving circuit 304, and a light emitting driving circuit 306. It is to be appreciated that in some embodiments, gate driving circuit 302, source driving circuit 304, and light emitting driving circuit 306 may not be on-panel display driving circuits, i.e., not parts of backplane 202, but instead are operatively coupled to backplane 202.

Gate driving circuit 302 in this embodiment is operatively coupled to backplane 202 via a plurality of gate lines (a.k.a. scan lines) and configured to scan array of display pixel circuits 212 based on at least some of control signals 108. For example, gate driving circuit 302 applies a plurality of scan signals, which are generated based on control signals 108 from control logic 104, to the plurality of gate lines for scanning array of display pixel circuits 212 in a gate scanning order. A scan signal is applied to the gate electrode of a switching transistor of each display pixel circuit 212 during the scan period to turn on the switching transistor so that the data signal for corresponding light emitting element 216 can be written by source driving circuit 304. It is to be appreciated that although one gate driving circuit 302 is illustrated in FIG. 3, in some embodiments, multiple gate driving circuits may work in conjunction with each other to scan array of display pixel circuits 212.

Source driving circuit 304 in this embodiment is operatively coupled to backplane 202 via a plurality of source lines (a.k.a. data lines) and configured to write display data 106 in a display frame to array of display pixel circuits 212 based on at least some of control signals 108. For example, source driving circuit 304 may simultaneously apply a plurality of data signals to the plurality of source lines for display pixel circuits 212. That is, source driving circuit 304 may include one or more shift registers, digital-analog converters (DAC), multiplexers (MUX), and arithmetic circuit for controlling a timing of application of voltage to the source electrode of the switching transistor of each display pixel circuit 212 (i.e., during the scan period in each frame) and a magnitude of the applied voltage according to gradations of display data 106. It is to be appreciated that although one source driving circuit 304 is illustrated in FIG. 3, in some embodiments, multiple source driving circuits may work in conjunction with each other to apply the data signals to the source lines for array of display pixel circuits 212.

As described above, a display pixel circuit-sharing scheme is applied to reduce the number of display pixel circuits 212 needed for driving array of light emitting elements 216. In this embodiment, array of light emitting elements 216 includes M rows and N columns and is divided into k groups, where k is an integer larger than 1. In some embodiments, each display pixel circuit 212 is configured to drive k light emitting elements 216 from each of the k groups. In some embodiments, the k light emitting elements driven by the same display pixel circuit 212 are arranged in the same column of array of light emitting elements 216. For example, each of the k groups of light emitting elements includes one or more entire rows of array of light emitting elements 216. As a result, each scan line is shared by k rows of light emitting elements from each of the k groups, and the k light emitting elements driven by the same display pixel circuit 212 receive display data via the same source line. As shown in FIG. 3, the number (N) of source lines S1-Sn is the same as the number (N) of columns of light emitting elements 216, while the number (M/k) of gate lines G1-G(m/k) is 1/k of the number (M) of rows of light emitting elements 216 because the k light emitting elements sharing the same display pixel circuit 212 are in the same column. In other words, to drive array of light emitting elements 216 having M rows and N columns, corresponding array of display pixel circuits 212 includes M/k rows and N columns. It is to be appreciated that in some embodiments, the k light emitting elements driven by the same display pixel circuit 212 are arranged in the same row of array of light emitting elements 216 or in different rows and columns of array of light emitting elements 216.

Light emitting driving circuit 306 in this embodiment is operatively coupled to backplane 202 and configured to cause each light emitting element 216 to emit light in each display frame based on at least some of control signals 108. For example, light emitting driving circuit 306 may receive part of control signals 108 including clock signals and enable signals (e.g., start emission STE signals) and generate a set of light emitting signals. Light emitting signals may be transmitted to array of display pixel circuits 212 via a plurality of light emitting lines. In some embodiments, each row of display pixel circuits 212 are connected to k light emitting lines as the light emitting signals cannot be shared by the k light emitting elements. That is, the number (M) of light emitting lines EM1-EMm is the same as the number (M) of rows of light emitting elements 216. Light emitting driving circuit 306 may include one or more shift registers. In some embodiments, light emitting driving circuit 306 is configured to cause each of the k groups of light emitting elements to sequentially emit light in a respective one of k sub-frame periods within a display frame period, and gate driving circuit 302 is configured to sequentially scan each of the k groups of light emitting elements in the respective sub-frame period within the display frame period. It is to be appreciated that although one light emitting driving circuit 306 is illustrated in FIG. 3, in some embodiments, multiple light emitting driving circuits may work in conjunction with each other.

In this embodiment, in additional to display driving circuits, display 102 further includes sensing control circuits including a row selector circuit 308 and a column readout circuit 310, which may be parts of backplane 202 or operatively coupled to backplane 202. In this embodiment, array of optical sensing elements 220 includes I rows and J columns, and array of sensing pixel circuits 214 includes I rows and J columns as well. Row selector circuit 308 in this embodiment is operatively coupled to array of sensing pixel circuits 214 via a plurality of select lines R1-Ri. Operation time sequence of array of optical sensing elements 220 is controlled by row selector circuit 308 via the select lines, so that each optical sensing element 220 may work orderly without crosstalk. In some embodiments, when only some of array of optical sensing elements 220 (e.g., in the predefined region or detected region) are needed to perform fingerprint recognition, row selector circuit 308 may select only some rows of array of optical sensing elements 220 by scanning only the corresponding rows of sensing pixel circuits 214 via the corresponding select lines. Column readout circuit 310 in this embodiment is operatively coupled to array of sensing pixel circuits 214 via a plurality of readout lines C1-Cj. Electrical signals generated by array of optical sensing elements 220 may be read by column readout circuit 310 via the readout lines. Column readout circuit 310 may perform additional functions, such as noise reduction, analog to digital conversion, column decoding, etc., to generate sensor signals 120. It is to be appreciated that although one row selector circuit 308 and one column readout circuit 310 are illustrated in FIG. 3, in some embodiments, multiple row selector circuits and/or multiple column readout circuits may work in conjunction with each other.

Figure 4:
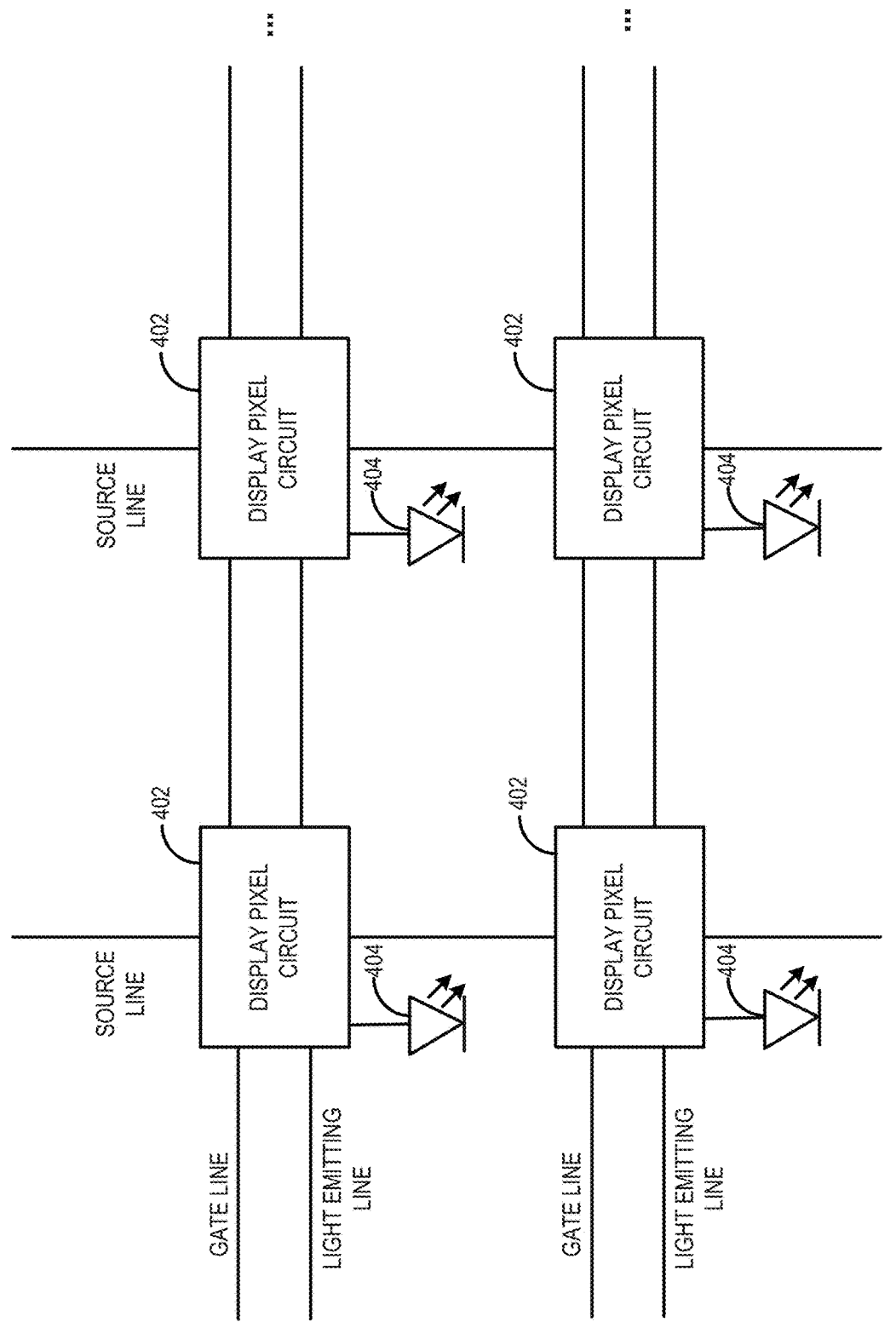
FIG. 4 is a depiction of a prior art arrangement of gate lines, source lines, and light emitting lines and an array of light emitting elements driven by an array of display pixel circuits.

FIG. 4 is a depiction of a prior art arrangement of gate lines, source lines, and light emitting lines and an array of light emitting elements 404 driven by an array of display pixel circuits 402. Array of display pixel circuits 402 in this prior art example are arranged in rows and columns, and each display pixel circuit 402 is configured to drive only one light emitting element 404. Display pixel circuits 402 in the same row are operatively coupled to one gate line. Thus, the number of rows of display pixel circuits 402 is the same as the number of gate lines. To control the timing and duration of light emission of each light emitting element 404, display pixel circuits 402 in the same row are also operatively coupled to one light emitting line. Thus, the number of rows of display pixel circuits 402 is also the same as the number of light emitting lines. Display pixel circuits 402 in the same column are operatively coupled to one source line for receiving the display data of light emitting elements 404 driven by display pixel circuits 402 in the column. Thus, the number of columns of display pixel circuits 402 is the same as the number of source lines. It is to be appreciated that because the arrangement of light emitting elements 404, e.g., the layout of the fine metal mask (FMM) used for patterning OLEDs, may not match the arrangement (layout) of array of display pixel circuits 402, the actual electrical connections between each pair of display pixel circuit 402 and the corresponding light emitting element 404 may differ in some examples.

Figure 5:
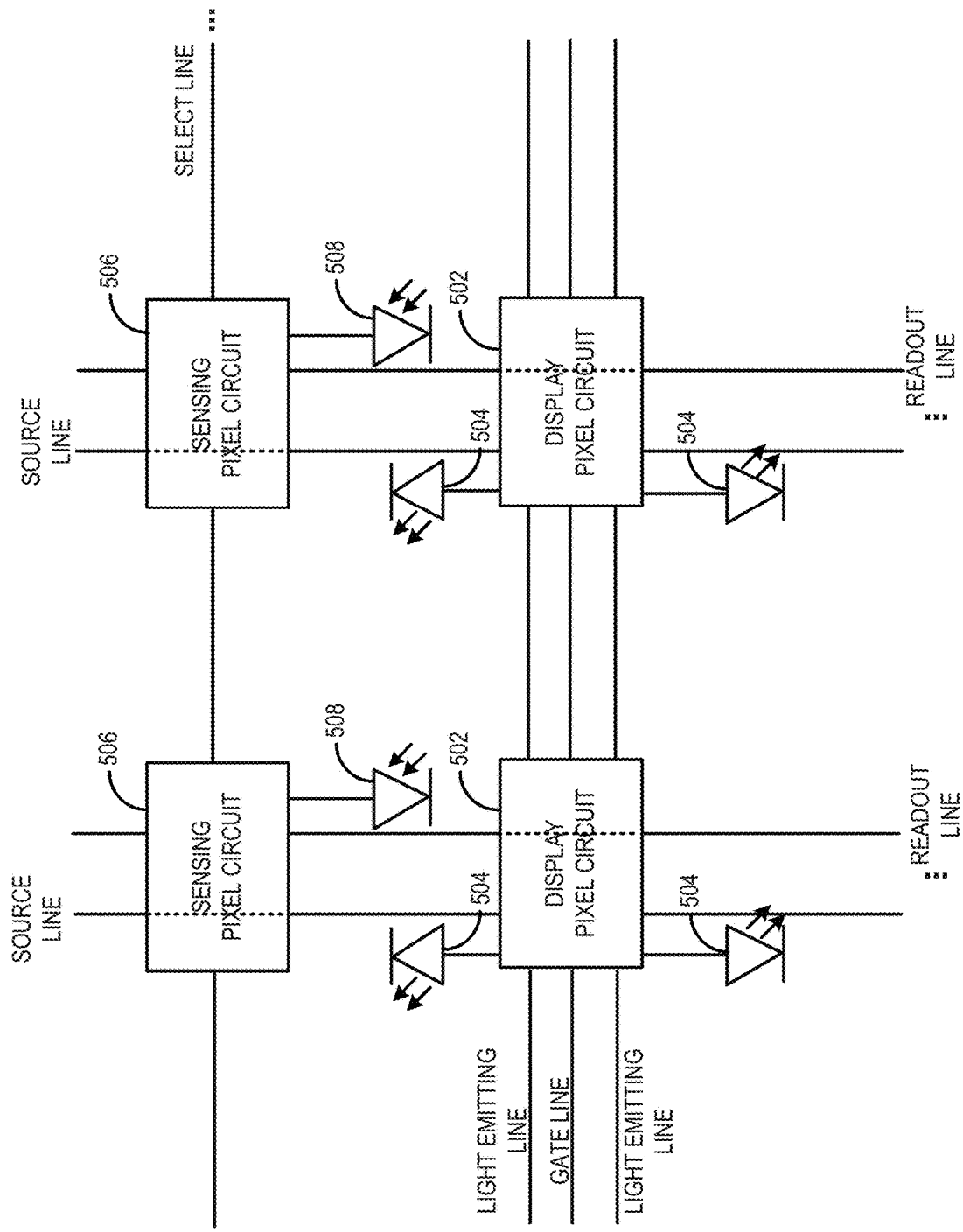
FIG. 5 is a depiction of an exemplary arrangement of gate lines, source lines, and light emitting lines and an array of light emitting elements driven by an array of display pixel circuits employing a display pixel circuit-sharing scheme as well as select lines and readout lines and an array of optical sensing elements driven by an array of sensing pixel circuits in accordance with an embodiment.

FIG. 5 is a depiction of an exemplary arrangement of gate lines, source lines, and light emitting lines and an array of light emitting elements 504 driven by an array of display pixel circuits 502 employing a display pixel circuit-sharing scheme as well as select lines and readout lines and an array of optical sensing elements 508 driven by an array of sensing pixel circuits 506 in accordance with an embodiment. In this embodiment, each display pixel circuit 502 is configured to drive two light emitting elements 504. It is to be appreciated that the number of light emitting elements 504 that can be driven by each display pixel circuit 502 is not limited to two and can be larger than two in some embodiments. In this embodiment, two light emitting elements 504 sharing the same display pixel circuit 502 receive the display data via the same source line, i.e., they are operatively coupled to the same source line. Thus, the number of columns of display pixel circuits 502 in FIG. 5 is the same as the number of columns of display pixel circuits 402 in FIG. 4, which is also the same as the number of source lines. The number of rows of display pixel circuits 502 in FIG. 5, however, is one-half of the number of rows of display pixel circuits 402 in FIG. 4. As a result, the number of gate lines in FIG. 5 is also one-half of the number of gate lines in FIG. 4.

In this embodiment, because two light emitting elements 504 share the same display pixel circuit 502, the light emission for each of two light emitting elements 504 occurs in a respective sub-frame in each display frame. That is, a time-division light emission approach may be applied in conjunction with the display pixel circuit-sharing scheme in this embodiment so that each of two light emitting elements 504 sharing the same display pixel circuit 502 sequentially emits light in the time period of a display frame. Thus, the number of light emitting lines in FIG. 5 is still the same as the number of light emitting lines in FIG. 4, which is twice of the number of rows of display pixel circuits 502. Accordingly, the display pixel circuit-sharing scheme in this embodiment can reduce the number of gate lines, but maintain the same number of source lines and light emitting lines. In this embodiment, because two light emitting elements 504 sharing the same display pixel circuit 502 receive the display data via the same source line, i.e., they are operatively coupled to the same source line, the charging time for each light emitting element 504 would not be reduced by the display pixel circuit-sharing scheme.

In this embodiment, because the number of display pixel circuits 502 needed for driving light emitting elements 504 is reduced compared with the prior art example in FIG. 4, additional area is saved on backplane 202 for arranging sensing pixel circuits 506. As shown in FIG. 5, each sensing pixel circuit 506 is configured to drive a respective optical sensing element 508 or any other types of sensing elements as described above. Sensing pixel circuits 506 in the same row are connected to a select line, and sensing pixel circuits 506 in the same column are connected to a readout line. Each sensing pixel circuit 506 may include multiple TFTs, such as three TFTs, four TFTs, or five TFTs.

In some embodiments, sensing pixel circuit 506 includes a reset transistor, an amplify transistor, a select transistor, and a transmit transistor. In addition to TFTs, sensing pixel circuit 506 may further includes a floating diffusion (FD) region located between the gate of the transmit transistor and the gate of the reset transistor. In operation, when no lights being received, the gate of the reset transistor receives a high level pulse signal for resetting the FD region, so that the FD region has a high level; the reset process is terminated when the gate pulse signal of the reset transistor turns to low level. Then, the gate of the select transistor receives a high level pulse signal for reading out an initial signal. The corresponding optical sensing element 508 (e.g., a photodiode) receives light during a preset period for generating carriers according to the light. Then, the gate of the transmit transistor receives a high level pulse signal for transmitting the carriers from optical sensing element 508 (e.g., the photodiode) to the FD region where the carriers are converted into a voltage signal. Thereafter, the select transistor receives a high level pulse signal for outputting the voltage signals from the FD region through the amplify transistor and the select transistor. Accordingly, collection and transmission of optical signals (image signals) can be achieved through collecting signals for two times and (subtraction) calculating of the two collecting results.

Figure 6:
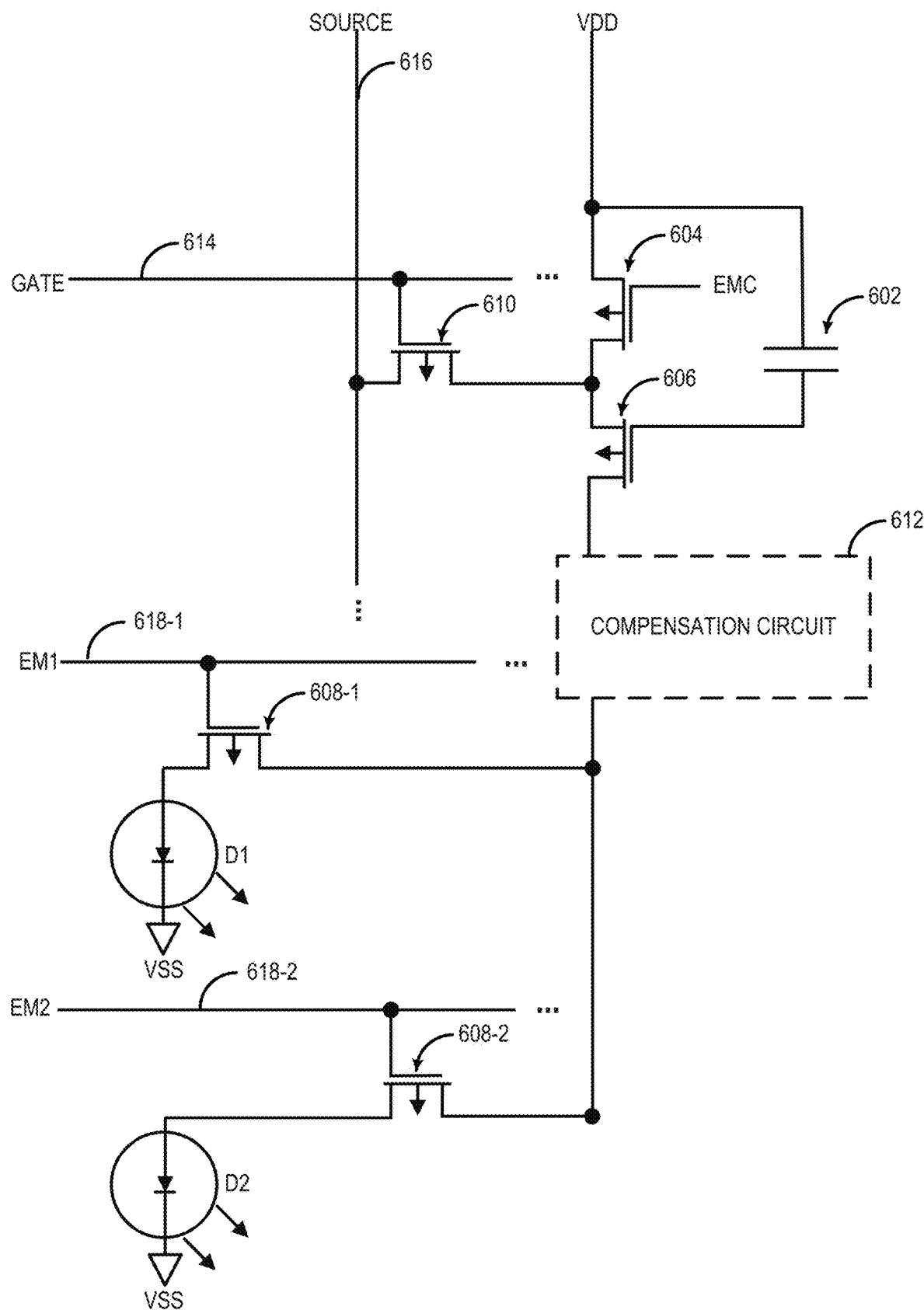
FIG. 6 is a circuit diagram illustrating one example of a display pixel circuit shared by two light emitting elements in accordance with an embodiment.

FIG. 6 is a circuit diagram illustrating one example of a display pixel circuit shared by two light emitting elements in accordance with an embodiment. The display pixel circuit in this example is shared by two light emitting elements D1 and D2 representing two subpixels. The display pixel circuit in this example includes a storage capacitor 602, a light emitting control transistor 604, a driving transistor 606, two light emitting transistors 608-1 and 608-2, and a switching transistor 610. The light emitting elements D1 and D2 may be OLEDs, such as top-emitting OLEDs, and each transistor may be a p-type transistor, such as a PMOS TFT. The display pixel circuit may be operatively coupled to gate driving circuit 302 via a gate line 614 and to source driving circuit 304 via a source line 616. Additionally or optionally, a compensation circuit 612 may be included in the display pixel circuit to ensure the brightness uniformity between the light emitting elements D1 and D2. Compensation circuit 612 can be in any configurations as known in the art, which includes one or more transistors and capacitors. The display pixel circuit may be suitable for any configuration of the direct-charging type of display pixel circuits because the data signal is directly applied via source line 616 to driving transistor 606 when switching transistor 610 is turned on during the charging period.

In this embodiment, light emitting control transistor 604 includes a gate electrode operatively coupled to a light emitting control signal EMC, a source electrode operatively coupled to a supply voltage Vdd, and a drain electrode. The light emitting control signal EMC may be provided by light emitting driving circuit 306. The light emitting control signal EMC in this example turns on light emitting control transistor 604 during each of the two light emitting periods for the two light emitting elements D1 and D2, respectively, within a display frame period. Driving transistor 606 includes a gate electrode operatively coupled to one electrode of storage capacitor 602, a source electrode operatively coupled to the drain electrode of light emitting control transistor 604, and a drain electrode. In each light emitting period (i.e., when light emitting control transistor 604 is turned on), driving transistor 606 provides a driving current to one of the light emitting elements D1 and D2 at a level determined based on the voltage level currently at storage capacitor 602.

Each of light emitting transistors 608-1 and 608-2 includes a gate electrode operatively coupled to a respective light emitting line 618-1 or 618-2, a source electrode operatively coupled to the drain electrode of driving transistor 606, and a drain electrode operatively coupled to the respective light emitting element D1 or D2. It is to be appreciated that in the examples in which compensation circuit 612 is included in the display pixel circuit, the source electrode of light emitting transistor 608-1 or 608-2 may not directly connect to the drain electrode of driving transistor 606. In any event, during a light emitting period (i.e., when light emitting control transistor 604 is turned on), a driving current path is formed through the supply voltage Vdd, light emitting control transistor 604, driving transistor 606, one of light emitting transistors 608-1 and 608-2, and one of the light emitting elements D1 and D2. Each of light emitting signals received from a respective light emitting line 618-1 or 618-2 turns on the respective light emitting transistor 608-1 or 608-2 during a respective one of the two light emitting periods within a display frame period to cause the respective light emitting element D1 or D2 to emit light.

In this embodiment, switching transistor 610 includes a gate electrode operatively coupled to gate line 614 transmitting a scan signal, a source electrode operatively coupled to source line 616 transmitting a data signal, and a drain electrode. The scan signal may turn on switching transistor 610 during each of the two charging periods within a display frame period to cause storage capacitor 602 to be charged at a respective level in the data signal for the respective light emitting element D1 or D2. The timing of the display data may be re-arranged in the converted display data by data converting module 806 of control logic 104 to accommodate the display pixel circuit-sharing schemes in the present disclosure. In this embodiment, storage capacitor 602 is charged twice in one display frame period for the two light emitting elements D1 and D2. During each charging period, the light emitting control signal EMC turns off light emitting control transistor 64 to block the supply voltage Vdd.

Figure 7:
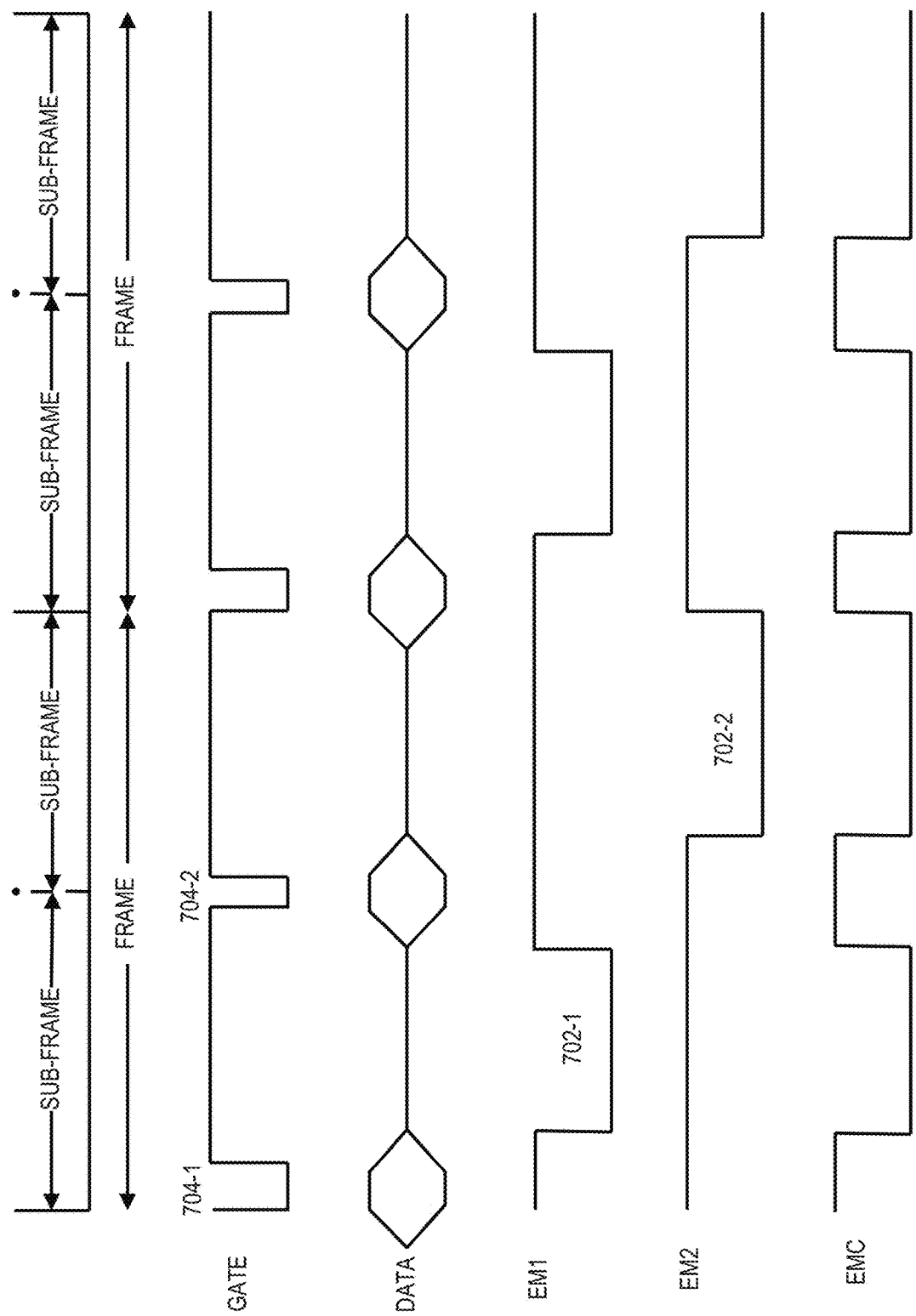
FIG. 7 is a timing diagram of the display pixel circuit shown in FIG. 6 in accordance with an embodiment.

FIG. 7 is a timing diagram of the display pixel circuit shown in FIG. 6 in accordance with an embodiment. In this embodiment, a display frame period is divided into two sub-frames for each of the two light emitting elements D1 and D2. The light emitting control signal EMC turns on light emitting control transistor 604 in each of the two sub-frames (i.e., light emitting control transistor 604 is turned on twice in the frame period). Accordingly, the first light emitting signal EM1 turns on first light emitting transistor 608-1 during first light emitting period 702-1 in the first sub-frame, and the second light emitting signal EM2 turns on second light emitting transistor 608-2 during second light emitting period 702-2 in the second sub-frame. That is, the timings of the light emitting control signal EMC and the two light emitting signals EM1 and EM2 are designed to coordinate with each other to create the two subsequent light emitting periods 702-1 and 702-2 within one display frame period.

In FIG. 7, the scan signal GATE turns on switching transistor 610 to charge storage capacitor 602 with the data signal DATA in each of the two sub-frames (i.e., storage capacitor 602 is charged twice in the frame period) before the light emitting control signal EMC turns on light emitting control transistor 604. That is, the scan signal GATE creates two charging periods 704-1 and 704-2 in one display frame period for the two light emitting elements D1 and D2, respectively. During first charging period 704-1, storage capacitor 602 is charged with the data signal DATA at the level for the first light emitting element D1. Then, during first light emitting period 702-1, the first light emitting element D1 emits light at a brightness level determined based on the charged voltage level of storage capacitor 602. At second charging period 704-2, storage capacitor 602 is charged with the data signal DATA at the level for the second light emitting element D2. Then, during second light emitting period 702-2, the second light emitting element D2 emits light at a brightness level determined based on the charged voltage level of storage capacitor 602. In this example, the light emitting control signal EMC turns off light emitting control transistor 604 during charging periods 704-1 and 704-2.

FIGS. 6 and 7 illustrate one example of display pixel circuits that are suitable for the display pixel circuit-sharing scheme in the present disclosure. It is to be appreciated that other examples of display pixel circuits may be applied for the display pixel circuit-sharing scheme in the present disclosure as well, such as the examples described in PCT Patent Application Publication No. WO2016141777, having a title of "Display Device and Pixel Circuit Thereof," which is incorporated herein by reference.

Figure 8:
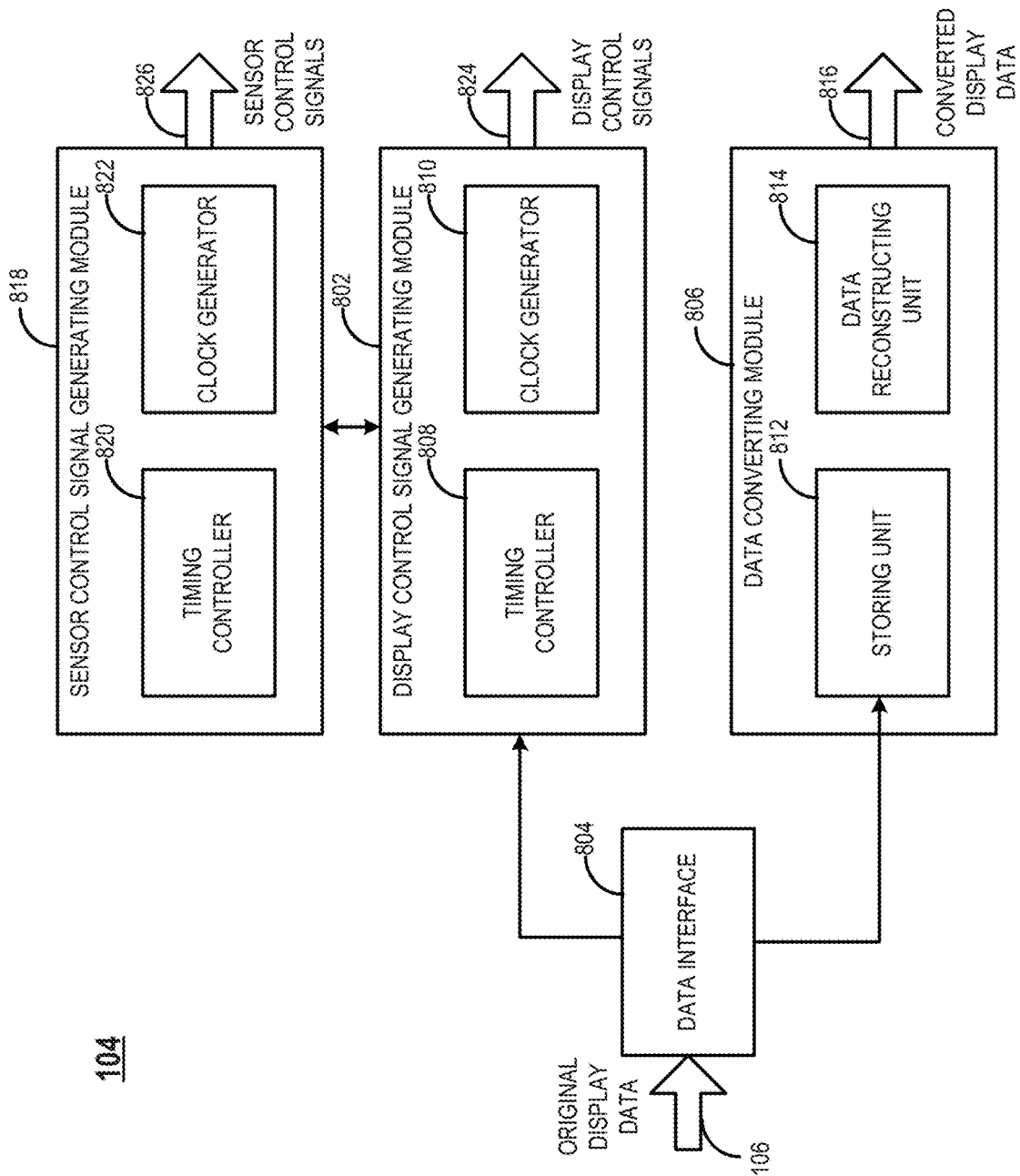
FIG. 8 is a block diagram illustrating one example of the control logic shown in FIG. 1 in accordance with an embodiment.

FIG. 8 is a block diagram illustrating one example of control logic 104 shown in FIG. 1 in accordance with an embodiment. In this embodiment, control logic 104 is an IC (but may alternatively include a state machine made of discrete logic and other components), which provides an interface function between processor 114/memory 116 and display 102. Control logic 104 may provide various control signals 108 with suitable voltage, current, timing, and de-multiplexing, to cause display 102 to show the desired text or image and perform under-display sensing functions. Control logic 104 may be an application-specific microcontroller and may include storage units such as RAM, flash memory, EEPROM, and/or ROM, which may store, for example, firmware and display fonts. In this embodiment, control logic 104 includes display control signal generating module 802, data interface 804, data converting module 806, and sensor control signal generating module 818. Data interface 804 may be any display data interface, such as but not limited to, display serial interface (DSI), display pixel interface (DPI), and display bus interface (DBI) by the Mobile Industry Processor Interface (MIPI) Alliance, unified display interface (UDI), digital visual interface (DVI), high-definition multimedia interface (HDMI), and DisplayPort (DP). Data interface 804 is configured to receive display data 106 in multiple display frames and any other control instructions 118 or test signals. Display data 106 may be received in consecutive display frames at any frame rates, such as 30, 60, 72, 120, or 240 frames per second (fps). The received display data 106 is forwarded by data interface 804 to display control signal generating module 802 and data converting module 806.

In this embodiment, display control signal generating module 802 provides display control signals 824, as part of control signals 108, to gate driving circuit 302, source driving circuit 304, and light emitting driving circuit 306 to drive the display subpixels. Display control signal generating module 802 may include TCON 808 and clock generator 810. TCON 808 may provide a variety of enable signals to gate driving circuit 302, source driving circuit 304, and light emitting driving circuit 306, respectively. Clock generator 810 may provide a variety of clock signals to gate driving circuit 302, source driving circuit 304, and light emitting driving circuit 306, respectively.

In this embodiment, data converting module 806 provides converted display data 816 to source driving circuit 304. Data converting module 806 is configured to convert original display data 106 into converted display data 816 based on a manner in which array of light emitting elements 216 is divided into the k groups of light emitting elements. The original display data 106 in one display frame includes a plurality of data signals to be transmitted to each column of light emitting elements 216 via a corresponding data line. The timing of each data signal is arranged according to the sequence of scanning each light emitting element 216 in the corresponding column. As array of light emitting elements 216 is divided into k groups, each of which emit light in a respective sub-frame in a display frame period, the sequence of scanning the rows of light emitting elements 216 is changed accordingly. Thus, the timing of each data signal is re-arranged in converted display data 816 according to the new scanning sequence determined based on the manner of division.

Data converting module 806 in this embodiment includes storing unit 812 and data reconstructing unit 814. Storing unit 812 is configured to receive original display data 106 and store original display data 106 in each display frame because the conversion of display data is performed at the frame level. Storing unit 812 may be data latches that temporally store original display data 106 forwarded by data interface 804. Data reconstructing unit 814 is operatively coupled to storing unit 812 and configured to reconstruct, in each display frame, original display data 106 into corresponding converted display data 816 based on the sequence in which the k groups of light emitting elements emit light within the display frame period. It is to be appreciated that in some embodiments, data converting module 806 may not be included in control logic 104. Instead, processor 114 may adjust the timing of original display data 106 by itself to accommodate the change of scanning sequence caused by the frame division.

Sensor signal generating module 818 in this embodiment provides sensor control signals 826, as part of control signals 108, to row selector circuit 308 and column readout circuit 310 to drive the array of sensing elements. Sensor control signal generating module 818 may include TCON 820 and clock generator 822. TCON 820 may provide a variety of enable signals to row selector circuit 308 and column readout circuit 310, respectively. Clock generator 822 may provide a variety of clock signals to row selector circuit 308 and column readout circuit 310, respectively. Sensor signal generating module 818 and display control signal generating module 802 may coordinate with each other when under-display sensing requires coordination between the light source and detector, e.g., for optical fingerprint recognition.

Figure 9:
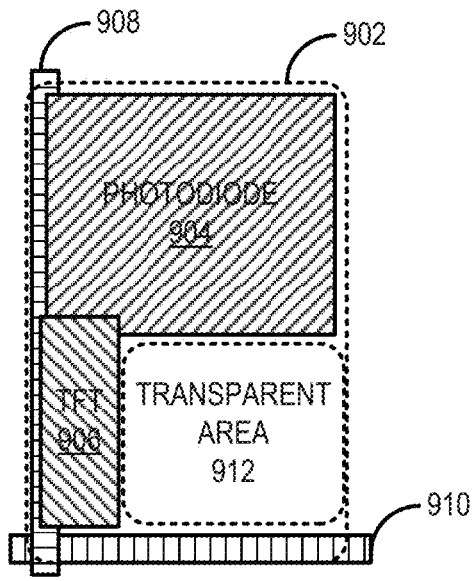
FIG. 9 is a depiction of a prior art optical sensing pixel cell in a sensing layer.

FIG. 9 is a depiction of a prior art optical sensing pixel cell 902 in a sensing layer. In this prior art example, optical sensing pixel cell 902 in the sensing layer includes a photodiode 904, one or more TFTs 906, and part of a readout line 908 and a select line 910 passing through optical sensing pixel cell 902. In some embodiments, photodiode 904 includes a top electrode and a bottom electrode (not shown). Optical sensing pixel cell 902 may include other structures, such as a storage capacitor. The above-mentioned elements in optical sensing pixel cell 902 are opaque, leaving a transparent area 912 in optical sensing pixel cell 902 through which the incident light beams from the light emitting elements underneath the sensing layer can penetrate.

Figure 10:
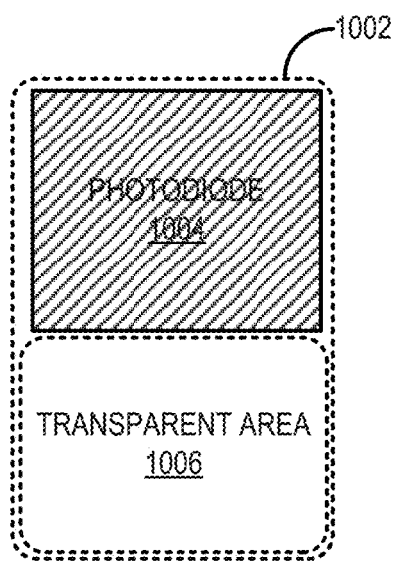
FIG. 10 is a depiction of an exemplary optical sensing pixel cell in a sensing layer in accordance with an embodiment.

FIG. 10 is a depiction of an exemplary optical sensing pixel cell 1002 in sensing layer 206 in accordance with an embodiment. As described above, each optical sensing pixel cell 1002 in sensing layer 206 includes a photodiode 1004, but not components of the respective sensing pixel circuit 214, e.g., TFTs, part of the select line and readout line, capacitor, etc., because the respective sensing pixel circuit 214 is formed on backplane 202, as opposed to in sensing layer 206. As a result, the size of transparent area 1006 in optical sensing pixel cell 1002 is increased compared with the size of transparent area 912 in prior art optical sensing pixel cell 902 in FIG. 9. Accordingly, the aperture ratio of optical sensing pixel cells can be increased in this embodiment, thereby improving the performance of fingerprint recognition.

Figure 11:
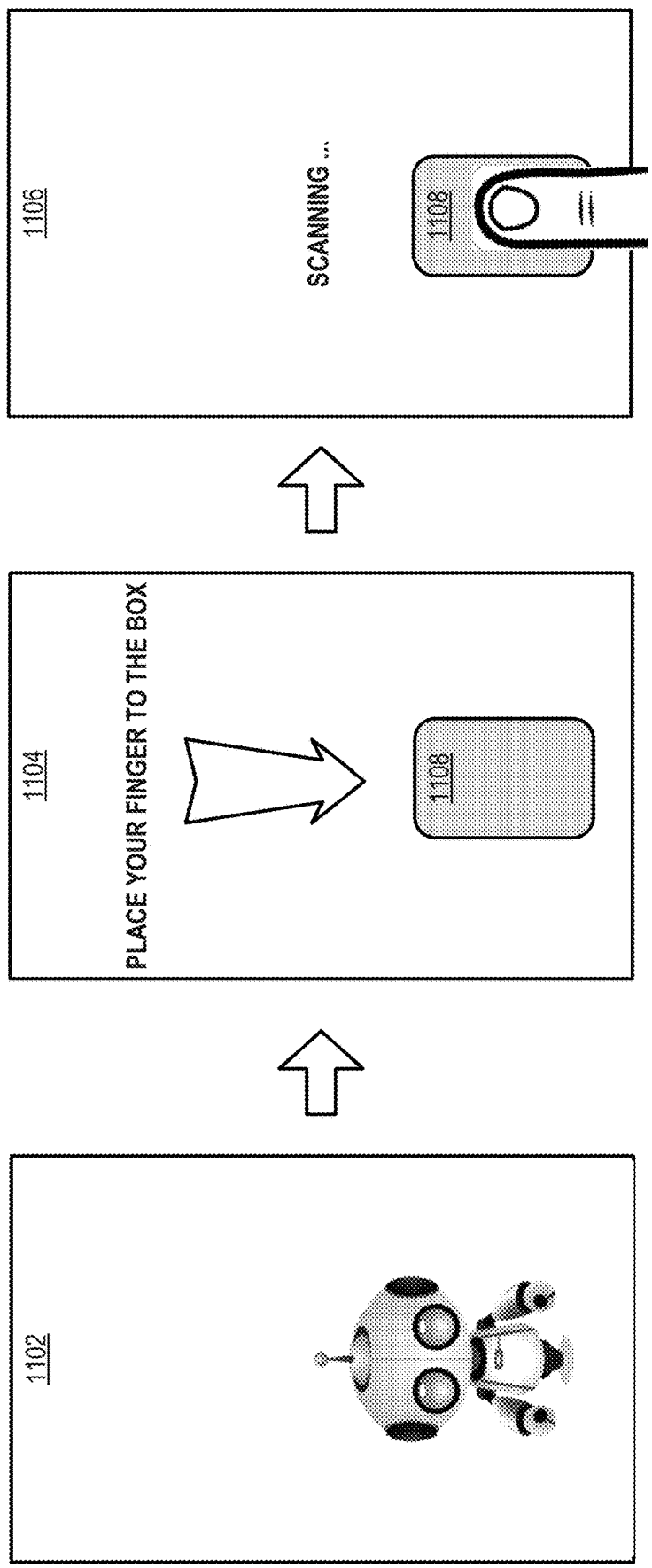
FIG. 11 is a depiction of an exemplary application of under-display fingerprint recognition in accordance with an embodiment.

FIG. 11 is a depiction of an exemplary application of under-display fingerprint recognition in accordance with an embodiment. In 1102, when no object is in contact with (or close proximity to) cover layer 208 of display 102, display 102 acts as a normal display. That is, array of light emitting elements 216 are configured to emit light to display an image based on display data 106 provided to display 102. Depending on the applications running on apparatus 100 (e.g., requiring user authentication) or the operation of apparatus 100 (e.g., system start), at any suitable time, display 102 may promote the user for under-display fingerprint recognition. In 1104, array of light emitting elements 216 are configured to emit light to display an image indicating a predefined region 1108 for fingerprint recognition. Light emitting elements 216 in predefined region 1108 may emit light in the same color as the light source for fingerprint recognition. In the meanwhile, optical sensing elements 220 in predefined region 1108 may also be ready for fingerprint recognition. In 1106, when a finger is in contact with cover layer 208 of display 102, e.g., within predefined region 1108, optical sensing elements 220 in predefined region 1108 are configured to detect fingerprint information of the finger based on the light generated by light emitting elements 216 in predefined region 1108 and reflected by the finger. As shown in 1106, a specific image for fingerprint recognition may be displayed on display 102. In some embodiments, in 1106, while light emitting elements 216 in predefined region 1108 act as the light source for fingerprint recognition, at the same time, other light emitting elements 216 outside predefined region 1108 can still act as a normal display for displaying an image (except in predefined region 1108) based on display data 106 provided to display 102. In some embodiments, only the rows of optical sensing elements 220 that contain optical sensing elements 220 within predefined region 1108 are selected by row selector circuit 308 for optical sensing.

Figure 12:
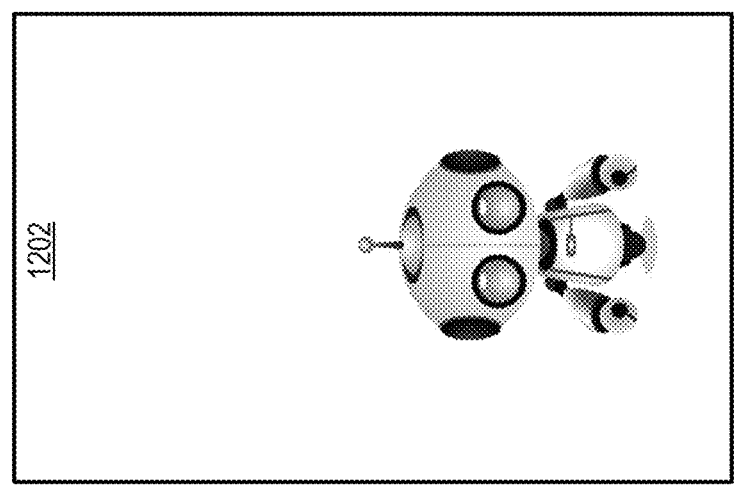
FIG. 12 is a depiction of another exemplary application of under-display fingerprint recognition in accordance with an embodiment.
Figure 12:
Figure 12:
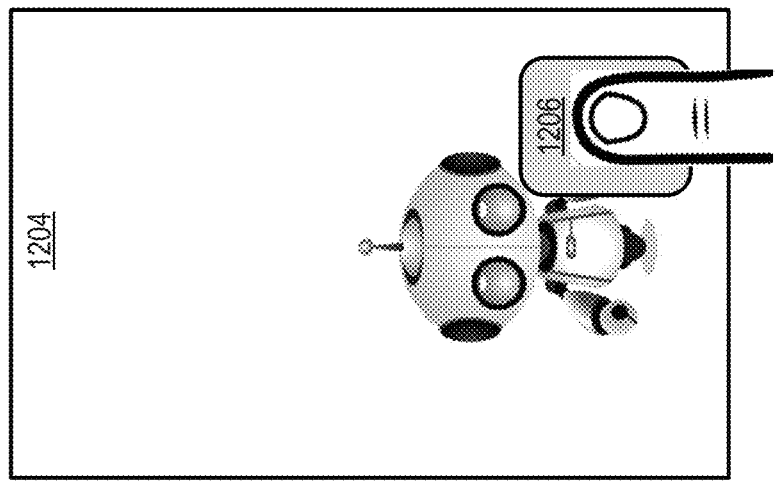

FIG. 12 is a depiction of another exemplary application of under-display fingerprint recognition in accordance with an embodiment. In 1202, when no object is in contact with cover layer 208 of display 102, display 102 acts as a normal display. That is, array of light emitting elements 216 are configured to emit light to display an image based on display data 106 provided to display 102. In 1204, at any time during the operation of apparatus 100, when a finger is in contact with (or in close proximity to) any region 1206 on cover layer 208 of display 102, region 1206 may be dynamically detected as the fingerprint recognition region, for example, by the object sensor in sensing layer 206. In response, light emitting elements 216 in detected region 1206 may emit light in the same color as the light source for fingerprint recognition. In the meanwhile, optical sensing elements 220 in detected region 1206 are configured to detect fingerprint information of the finger based on the light generated by light emitting elements 216 in detected region 1206 and reflected by the finger. In some embodiments, in 1204, while light emitting elements 216 in detected region 1206 act as the light source for fingerprint recognition, at the same time, other light emitting elements 216 outside detected region 1206 can still act as a normal display for displaying an image (except in detected region 1206) based on display data 106 provided to display 102. In some embodiments, only the rows of optical sensing elements 220 that contain optical sensing elements 220 in detected region 1206 are selected by row selector circuit 308 for optical sensing. It is to be appreciated that detected region 1206 may be dynamically changed in response to moving the finger around cover layer 208 of display 102.

Figure 13:
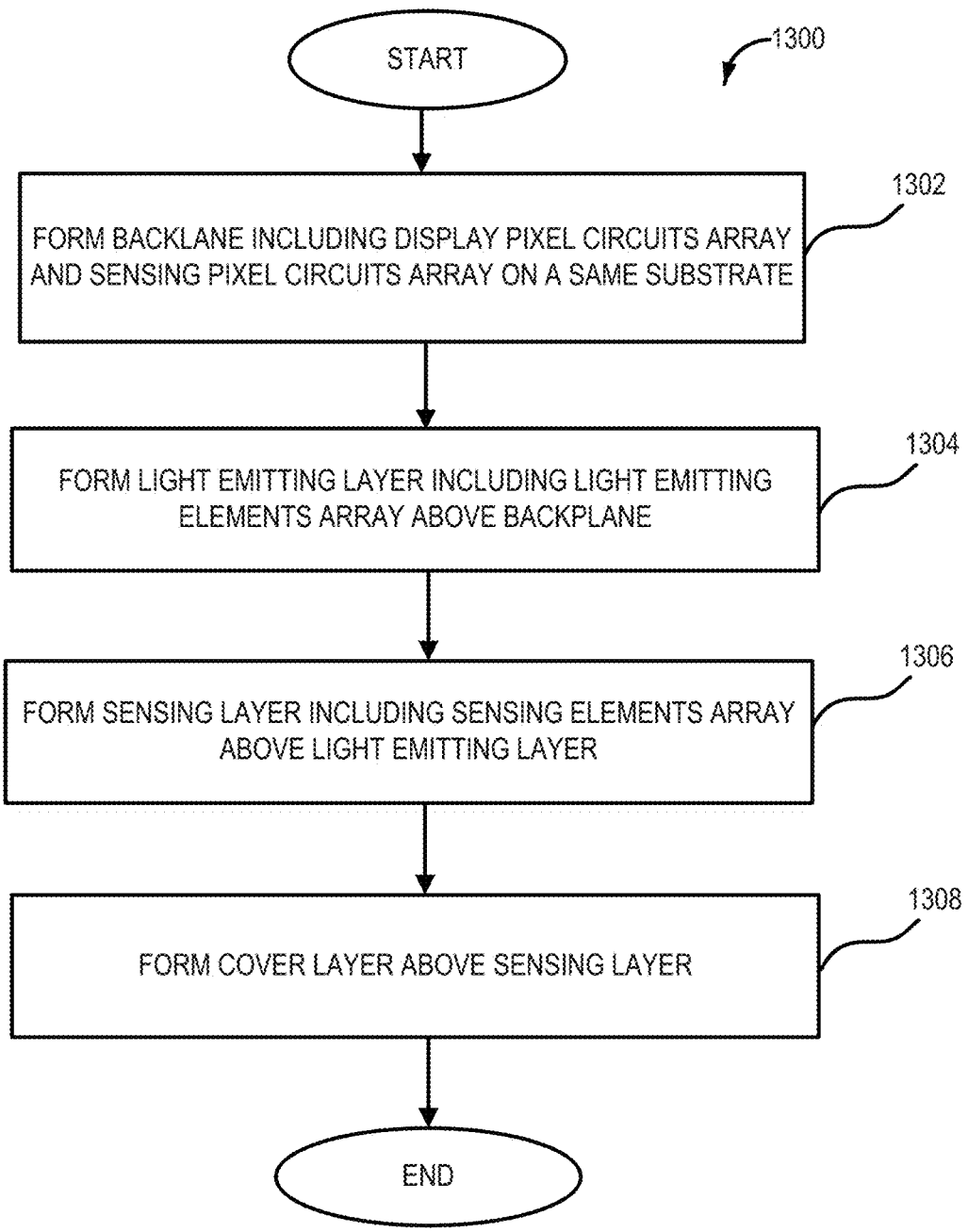
FIG. 13 is a flow chart of a method for manufacturing an integrated display and sensing apparatus in accordance with one embodiment.

FIG. 13 is a flow chart of a method for manufacturing an integrated display and sensing apparatus. Method 1300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 13, as will be understood by a person of ordinary skill in the art.

Method 1300 shall be described with reference to FIG. 2A. However, method 1300 is not limited to that example embodiment. In 1302, backplane 202 is formed. Backplane 202 includes array of display pixel circuits 212 and array of sensing pixel circuits 214 that are formed on the same substrate. In 1304, light emitting layer 204 is formed above backplane 202. Light emitting layer 204 includes an array of light emitting elements 216, such as OLEDs. In 1306, sensing layer 206 is formed above light emitting layer 204. Sensing layer 206 includes an array of sensing elements, such as optical sensing elements 220. In some embodiments, the array sensing elements may include at least one of a capacitive sensing element, a thermal sensing element, an ultrasonic sensing element, and a pressure sensing element. In 1308, cover layer 208 is formed above sensing layer 206.

In some embodiments, sensing layer 206 may be formed before light emitting layer 204, and light emitting layer 204 may be formed above sensing layer 206, for example as shown in FIG. 2B. In some embodiments, light emitting layer 204 and sensing layer 206 may be formed on the same substrate above backplane 202, for example as shown in FIG. 2C. In some embodiments, sensing layer 206 may be formed before backplane 202, and backplane 202 may be formed above sensing layer 206, for example as shown in FIG. 2D.

Also, integrated circuit design systems (e.g., work stations) are known that create wafers with integrated circuits based on executable instructions stored on a computer-readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, units, and circuits described herein may also be produced as integrated circuits by such systems using the computer-readable medium with instructions stored therein.

For example, an integrated circuit with the aforedescribed logic, units, and circuits may be created using such integrated circuit fabrication systems. The computer-readable medium stores instructions executable by one or more integrated circuit design systems that causes the one or more integrated circuit design systems to design an integrated circuit. In one example, the designed integrated circuit includes a backplane, a light emitting layer, a sensing layer, and a cover layer. The backplane includes an array of display pixel circuits and an array of sensing pixel circuits. The array of display pixel circuits and the array of sensing pixel circuits are formed on a same substrate. The light emitting layer includes an array of light emitting elements above the backplane. Each display pixel circuit of the array of display pixel circuits is configured to drive a plurality of light emitting elements in the array of light emitting elements. The sensing layer includes an array of optical sensing elements above the light emitting layer. Each sensing pixel circuit of the array of sensing pixel circuits is configured to drive a respective optical sensing element in the array of optical sensing elements. The cover layer is above the sensing layer. When an object is in contact with the cover layer, at least one optical sensing element of the array of optical sensing elements is configured to detect optical information of the object based, at least in part, on light generated by at least one light emitting element of the array of light emitting elements and reflected by the object.

In another example, the designed integrated circuit includes a display and control logic. The display includes a backplane, a light emitting layer, a sensing layer, and a cover layer. The backplane includes an array of display pixel circuits and an array of sensing pixel circuits. The array of display pixel circuits and the array of sensing pixel circuits are formed on a same substrate. The light emitting layer includes an array of OLEDs above the backplane. Each display pixel circuit of the array of display pixel circuits is configured to drive a plurality of OLEDs in the array of OLEDs. The sensing layer includes an array of photodiodes above the light emitting layer. Each sensing pixel circuit of the array of sensing pixel circuits is configured to drive a respective photodiode in the array of photodiodes. The cover layer is above the sensing layer. The control logic is operatively coupled to the display and configured to receive display data and provide control signals based, at least in part, on the display data to control operation of the array of display pixel circuits and operation of the array of sensing pixel circuits. When no object is in contact with the cover layer, the array of OLEDs are configured to emit light to display an image based on the display data received by the control logic. When an object is in contact with the cover layer, at least one photodiode of the array of photodiodes is configured to detect optical information of the object based, at least in part, on light generated by at least one OLED of the array of OLEDs and reflected by the object.

In still another example, the designed integrated circuit includes a backplane, a light emitting layer, a sensing layer, and a cover layer. The backplane includes an array of display pixel circuits and an array of sensing pixel circuits. The array of display pixel circuits and the array of sensing pixel circuits are formed on a same substrate. The light emitting layer includes an array of light emitting elements above the backplane. Each display pixel circuit of the array of display pixel circuits is operatively coupled to a plurality of light emitting elements in the array of light emitting elements and is configured to drive the plurality of light emitting elements. The sensing layer includes an array of sensing elements above the light emitting layer. Each sensing pixel circuit of the array of sensing pixel circuits is operatively coupled to a respective sensing element in the array of sensing elements and is configured to drive the respective sensing element. The cover layer is above the sensing layer. When a finger is in contact with the cover layer, at least one sensing element of the array of sensing elements is configured to detect fingerprint information of the finger. When no finger is in contact with the cover layer, the array of light emitting elements are configured to emit light to display an image.

In yet another example, the designed integrated circuit includes a backplane, a sensing layer, a light emitting layer, and a cover layer. The backplane includes an array of display pixel circuits and an array of sensing pixel circuits. The array of display pixel circuits and the array of sensing pixel circuits are formed on a same substrate. The sensing layer includes an array of sensing elements above the backplane. Each sensing pixel circuit of the array of sensing pixel circuits is operatively coupled to a respective sensing element in the array of sensing elements and is configured to drive the respective sensing element. The light emitting layer includes an array of light emitting elements above the sensing layer. Each display pixel circuit of the array of display pixel circuits is operatively coupled to a plurality of light emitting elements in the array of light emitting elements and is configured to drive the plurality of light emitting elements. The cover layer is above the light emitting layer. When a finger is in contact with the cover layer, at least one sensing element of the array of sensing elements is configured to detect fingerprint information of the finger. When no finger is in contact with the cover layer, the array of light emitting elements are configured to emit light to display an image.

In yet another example, the designed integrated circuit includes a backplane, a sensing layer, a light emitting layer, and a cover layer. The backplane includes an array of display pixel circuits and an array of sensing pixel circuits. The array of display pixel circuits and the array of sensing pixel circuits are formed on a same first substrate. The sensing layer includes an array of sensing elements above the backplane. Each sensing pixel circuit of the array of sensing pixel circuits is operatively coupled to a respective sensing element in the array of sensing elements and is configured to drive the respective sensing element. The light emitting layer includes an array of light emitting elements above the sensing layer. The light emitting layer is formed on a same second substrate as the sensing layer. Each display pixel circuit of the array of display pixel circuits is operatively coupled to a plurality of light emitting elements in the array of light emitting elements and is configured to drive the plurality of light emitting elements. The cover layer is above the sensing layer and the light emitting layer. When a finger is in contact with the cover layer, at least one sensing element of the array of sensing elements is configured to detect fingerprint information of the finger. When no finger is in contact with the cover layer, the array of light emitting elements are configured to emit light to display an image.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. An apparatus, comprising:
   a backplane comprising an array of display pixel circuits and an array of sensing pixel circuits, wherein the array of display pixel circuits and the array of sensing pixel circuits are formed on a same substrate;
   a light emitting layer comprising an array of light emitting elements divided into k groups of light emitting elements, k being an integer larger than 1, wherein each display pixel circuit of the array of display pixel circuits is configured to drive k light emitting elements from each of the k groups of light emitting elements in a respective one of k sub-frame periods within a frame period, the array of light emitting elements is arranged in x rows and y columns, and the array of display pixel circuits is driven by x/k gate lines and y source lines;
a black matrix disposed between adjacent light emitting elements;
a sensing layer comprising an array of optical sensing elements, wherein each sensing pixel circuit of the array of sensing pixel circuits is configured to drive a respective optical sensing element in the array of optical sensing elements, and the black matrix is disposed overlapping the array of optical sensing elements; and
a cover layer above the sensing layer and the light emitting layer,
wherein:
the k light emitting elements comprise a first light emitting element connected with a first light emitting transistor and a second light emitting element connected with a second light emitting transistor, and the k sub-frame periods comprise a first sub-frame period and a second sub-frame period that is non-overlapping with the first sub-frame period;
in response to a switching transistor being turned on by a scan signal, a storage capacitor, connected with a terminal of a light emitting control transistor and a terminal of a driving transistor, is being charged with a data signal received discontinuously;
in response to, during the first sub-frame period where the data signal pauses, the light emitting control transistor being turned on by a light emitting control signal and the first light emitting transistor being turned on by a first light emitting signal, a first current flows through the driving transistor to the first light emitting element according to a charged level of the storage capacitor, the light emitting control signal being independent of the scan signal;
in response to, during the second sub-frame period after the first sub-frame period, the light emitting control transistor being turned on by the light emitting control signal and the second light emitting transistor being turned on by a second light emitting signal, a second current flows through the driving transistor to the second light emitting element according to the charged level of the storage capacitor;
the light emitting layer is formed above the backplane; and
when an object is in contact with the cover layer, at least one optical sensing element of the array of optical sensing elements detects optical information of the object based, at least in part, on light generated by at least one light emitting element of the array of light emitting elements and reflected by the object, wherein the at least one optical sensing element and the at least one light emitting element are located in a sub-area smaller than a size of the light emitting layer, a number of the at least one optical sensing element being less than a total number of the optical sensing elements in the respective array, a number of the at least one light emitting element being less than a total number of the light emitting elements in the respective array, wherein;
a number of sensing pixel circuits in the array of sensing pixel circuits, arranged in the backplane, is 1/k of a number of light emitting elements in the array of light emitting elements arranged in the light emitting layer, and the sensing layer contains no thin-film transistors to increase an aperture ratio of the sensing layer for improving fingerprint recognition; and
a location of the sub-area on the apparatus is dynamically changed in response to movement of the object.

2. The apparatus of claim 1, wherein the sensing layer further comprises an object sensor configured to detect the sub-area in which the object is in contact with the cover layer, the sub-area being a predefined region.

3. The apparatus of claim 2, wherein before the object is in contact with the cover layer, the array of light emitting elements is configured to emit light to display an image indicating the predefined region.

4. The apparatus of claim 1, wherein when the object is in contact with the cover layer, the at least one light emitting element of the array of light emitting elements is configured to emit light in a same color.

5. The apparatus of claim 4, wherein:
a first beam of light penetrates through the sensing layer and the cover layer to irradiate an interface between the cover layer and the object; and
at least part of the first beam of light is reflected at the interface to form a second beam of light that is transmitted back to the at least one optical sensing element of the array of optical sensing elements.

6. The apparatus of claim 4, wherein the at least one light emitting element in the sub-area functions as a light source for recognizing the object, and other light emitting elements outside the sub-area display an image.

7. The apparatus of claim 1, wherein the k light emitting elements driven by a same display pixel circuit are arranged in a same column of the array of light emitting elements.

8. The apparatus of claim 1, wherein each of the k groups of light emitting elements comprises one or more entire rows of the array of light emitting elements.

9. The apparatus of claim 1, wherein the k light emitting elements driven by a same display pixel circuit receive display data via a same source line.

10. The apparatus of claim 1, further comprising:
a plurality of scan lines operatively coupled to the array of display pixel circuits, wherein each of the plurality of scan lines is shared by k rows of light emitting elements from each of the k groups of light emitting elements.

11. The apparatus of claim 1, further comprising:
a light emitting driving circuit operatively coupled to the array of display pixel circuits and configured to cause each of the k groups of light emitting elements to sequentially emit light in a respective one of the k sub-frame periods within a frame period; and
a gate driving circuit operatively coupled to the array of display pixel circuits and configured to sequentially scan each of the k groups of light emitting elements in the respective sub-frame period within the frame period.

12. The apparatus of claim 1, wherein each light emitting element of the array of light emitting elements is a top-emitting organic light emitting diode (OLED).

13. The apparatus of claim 1, further comprising:
a row selector circuit operatively coupled to the array of sensing pixel circuits and configured to scan the at least one optical sensing element of the array of optical sensing elements; and
a column readout circuit operatively coupled to the array of sensing pixel circuits and configured to read signals from the at least one optical sensing element of the array of optical sensing elements, wherein only the optical sensing elements in the sub-area are selected by the row selector circuit for optical sensing.

14. The apparatus of claim 1, wherein each optical sensing element of the array of optical sensing elements is a photodiode.

15. The apparatus of claim 1, wherein when the object is in contact with the cover layer, other light emitting elements in the array of light emitting elements are configured to emit light to display at least part of an image based on display data provided to the apparatus.

16. The apparatus of claim 1, wherein when no object is in contact with the cover layer, the array of light emitting elements is configured to emit light to display an image based on display data provided to the apparatus.

17. The apparatus of claim 1, wherein the sub-area is at one of a predefined location and a randomly-selected location.

18. The apparatus of claim 1, wherein the light emitting layer and the sensing layer are on a different side of a single combined layer.

19. The apparatus of claim 1, wherein a light emitting transistor is coupled between the driving transistor and each one of the k light emitting elements, and when the light emitting control transistor is turned on, a driving current path is formed through the light emitting control transistor, the driving transistor, the light emitting transistor, and each one of the k light emitting elements.

20. The apparatus of claim 1, wherein the driving transistor provides the driving current to each one of the k light emitting elements at a level determined based on a voltage level at a capacitor located between a source electrode of the light emitting control transistor and a gate electrode of the driving transistor.

21. An apparatus, comprising:
 a display comprising:
  a backplane comprising an array of display pixel circuits and an array of sensing pixel circuits, wherein the array of display pixel circuits and the array of sensing pixel circuits are formed on a same substrate,
  a light emitting layer comprising an array of OLEDs above the backplane and divided into k groups, k being an integer larger than 1, wherein each display pixel circuit of the array of display pixel circuits is configured to drive k OLEDs from each of the k groups of OLEDs in a respective one of k sub-frame periods within a frame period, the array of light emitting elements is arranged in x rows and y columns, and the array of display pixel circuits is driven by x/k gate lines and y source lines,
  a black matrix disposed between adjacent OLEDs,
  a sensing layer comprising an array of photodiodes above the light emitting layer, wherein each sensing pixel circuit of the array of sensing pixel circuits is configured to drive a respective photodiode in the array of photodiodes, and the black matrix is disposed overlapping the array of photodiodes, and
  a cover layer above the sensing layer and the light emitting layer; and
 control logic operatively coupled to the display and configured to receive display data and provide control signals based, at least in part, on the display data to control operation of the array of display pixel circuits and operation of the array of sensing pixel circuits,
 wherein:
  the k OLEDs comprise a first OLED connected with a first light emitting transistor and a second OLED connected with a second light emitting transistor, and the k sub-frame periods comprise a first sub-frame period and a second sub-frame period that is non-overlapping with the first sub-frame period;
  in response to a switching transistor being turned on by a scan signal, a storage capacitor, connected with a terminal of a light emitting control transistor and a terminal of a driving transistor, is being charged with a data signal received discontinuously;
  in response to, during the first sub-frame period where the data signal pauses, the light emitting control transistor being turned on by a light emitting control signal and the first light emitting transistor being turned on by a first light emitting signal, a first current flows through the driving transistor to the first OLED according to a charged level of the storage capacitor, the light emitting control signal being independent of the scan signal;
  in response to, during the second sub-frame period after the first sub-frame period, the light emitting control transistor being turned on by the light emitting control signal and the second light emitting transistor being turned on by a second light emitting signal, a second current flows through the driving transistor to the second OLED according to the charged level of the storage capacitor;
  the light emitting layer is formed above the backplane;
  when no object is in contact with the cover layer, the array of OLEDs is configured to emit light to display an image based on the display data received by the control logic; and
  when an object is in contact with the cover layer, at least one photodiode of the array of photodiodes detects optical information of the object based, at least in part, on light generated by at least one OLED of the array of OLEDs and reflected by the object, wherein the at least one photodiode and the at least one OLED are located in a sub-area smaller than a size of the light emitting layer, a number of the at least one photodiode being less than a total number of the photodiodes in the respective array, a number of the at least one OLED being less than a total number of the OLEDs in the respective array,
  wherein:
   a number of photodiodes in the array of photodiodes, arranged in the backplane, is 1/k of a number of OLEDs in the array of OLEDs arranged in the light emitting layer, and the sensing layer contains no thin-film transistors to increase an aperture ratio of the sensing layer for improving fingerprint recognition; and
   a location of the sub-area on the apparatus is dynamically changed in response to movement of the object.

22. An apparatus, comprising:
 a backplane comprising an array of display pixel circuits and an array of sensing pixel circuits, wherein the array of display pixel circuits and the array of sensing pixel circuits are formed on a same substrate;
 a light emitting layer comprising an array of light emitting elements above the backplane and divided into k groups, k being an integer larger than 1, wherein each display pixel circuit of the array of display pixel circuits is operatively coupled to k light emitting elements from each of the k groups of light emitting elements and is configured to drive the k light emitting elements in a respective one of k sub-frame periods within a frame period, the array of light emitting elements is arranged in x rows and y columns, and the array of display pixel circuits is driven by x/k gate lines and y source lines;

a black matrix disposed between adjacent light emitting elements;

a sensing layer comprising an array of sensing elements above the light emitting layer, wherein each sensing pixel circuit of the array of sensing pixel circuits is operatively coupled to a respective sensing element in the array of sensing elements and is configured to drive the respective sensing element, and the black matrix is disposed overlapping the array of sensing elements; and a cover layer above the sensing layer and the light emitting layer, wherein:

the k light emitting elements comprise a first light emitting element connected with a first light emitting transistor and a second light emitting element connected with a second light emitting transistor, and the k sub-frame periods comprise a first sub-frame period and a second sub-frame period that is non-overlapping with the first sub-frame period;

in response to a switching transistor being turned on by a scan signal, a storage capacitor, connected with a terminal of a light emitting control transistor and a terminal of a driving transistor, is being charged with a data signal received discontinuously;

in response to, during the first sub-frame period where the data signal pauses, the light emitting control transistor being turned on by a light emitting control signal and the first light emitting transistor being turned on by a first light emitting signal, a first current flows through the driving transistor to the first light emitting element according to a charged level of the storage capacitor, the light emitting control signal being independent of the scan signal;

in response to, during the second sub-frame period after the first sub-frame period, the light emitting control transistor being turned on by the light emitting control signal and the second light emitting transistor being turned on by a second light emitting signal, a second current flows through the driving transistor to the second light emitting element according to the charged level of the storage capacitor;

the light emitting layer is formed above the backplane;

when a finger is in contact with the cover layer, at least one sensing element of the array of sensing elements detects fingerprint information of the finger, the at least one sensing element is located in a sub-area smaller than a size of the light emitting layer, a number of the at least one sensing element being less than a total number of the sensing elements in the respective array; and when no finger is in contact with the cover layer, the array of light emitting elements is configured to emit light to display an image, wherein;

a number of sensing pixel circuits in the array of sensing pixel circuits, arranged in the backplane, is 1/k of a number of light emitting elements in the array of light emitting elements arranged in the light emitting layer, and the sensing layer contains no thin-film transistors to increase an aperture ratio of the sensing layer for improving fingerprint recognition; and a location of the sub-area on the apparatus is dynamically changed in response to moving of the finger.

23. The apparatus of claim 22, wherein the k light emitting elements driven by a same display pixel circuit are arranged in a same column of the array of light emitting elements.

24. The apparatus of claim 22, wherein each of the k groups of light emitting elements comprises one or more entire rows of the array of light emitting elements.

25. The apparatus of claim 22, wherein the k light emitting elements driven by a same display pixel circuit are configured to receive display data via a same source line.

26. The apparatus of claim 22, further comprising:

a plurality of scan lines operatively coupled to the array of display pixel circuits, wherein each of the plurality of scan lines is shared by k rows of light emitting elements from each of the k groups of light emitting elements.

27. The apparatus of claim 22, wherein the array of sensing elements comprises at least one of an optical sensing element.

28. The apparatus of claim 22, wherein the array of sensing elements comprises at least one of a capacitive sensing element.

29. The apparatus of claim 22, wherein the array of sensing elements comprises at least one of a thermal sensing element.

30. The apparatus of claim 22, wherein the array of sensing elements comprises at least one of a ultrasonic sensing element.

31. The apparatus of claim 22, wherein the array of sensing elements comprises at least one of a pressure sensing element.

* * * * *